US011124063B2

(12) United States Patent
Albrecht

(10) Patent No.: US 11,124,063 B2
(45) Date of Patent: Sep. 21, 2021

(54) TURBINE SYSTEM FOR SAVING ENERGY IN A VEHICLE

(71) Applicant: Peter Albrecht, Berlin (DE)

(72) Inventor: Peter Albrecht, Berlin (DE)

(*) Notice: Subject to any disclaimer, the term of this patent is extended or adjusted under 35 U.S.C. 154(b) by 0 days.

(21) Appl. No.: 16/070,668

(22) PCT Filed: Jan. 18, 2017

(86) PCT No.: PCT/EP2017/050936
§ 371 (c)(1),
(2) Date: Jul. 17, 2018

(87) PCT Pub. No.: WO2017/125409
PCT Pub. Date: Jul. 27, 2017

(65) Prior Publication Data
US 2019/0016212 A1 Jan. 17, 2019

(30) Foreign Application Priority Data

Jan. 18, 2016 (DE) .................... 10 2016 100 716.1
May 31, 2016 (EP) .................................. 16172177

(51) Int. Cl.
*B60K 16/00* (2020.01)
*F03D 9/32* (2016.01)
(Continued)

(52) U.S. Cl.
CPC .............. *B60K 16/00* (2013.01); *B60L 8/006* (2013.01); *B61D 43/00* (2013.01); *F01D 15/10* (2013.01); *F03D 1/04* (2013.01); *F03D 1/0625* (2013.01); *F03D 9/32* (2016.05); *B60K 2016/006* (2013.01); *B60L 2200/10* (2013.01);
(Continued)

(58) Field of Classification Search
CPC ..... B60K 16/00; B60K 2016/006; F03D 1/04; F03D 1/0625; F03D 9/32; B61D 43/00; F01D 15/10; Y02T 10/7083; Y02T 10/90; Y02E 10/728; F05D 2240/90; F05D 2220/76; F05B 2250/324; F05B 2250/12; F05B 2240/221; F05B 2240/14; F05B 2220/706; F05B 2240/941; B60Y 2200/92;
(Continued)

(56) References Cited
U.S. PATENT DOCUMENTS 1,100,031 A * 6/1914 Silver .................... A63H 33/40
446/218
1,198,501 A * 9/1916 Wintermute .......... B62D 57/04
180/7.4
(Continued)

FOREIGN PATENT DOCUMENTS

FR 2868361 A1 * 10/2005 ............... F03D 9/25
JP 2011226414 A * 11/2011
KR 2013023413 * 3/2018

*Primary Examiner* — Jacob B Meyer
(74) *Attorney, Agent, or Firm* — FisherBroyles, LLP

(57) ABSTRACT

The invention relates to a turbine system for fuel saving in a vehicle, wherein the turbine system comprises a turbine and a turbine mount with a windshield, wherein the windshield and the wind turbine have a cross-sectional area, which is at least 60%, preferably at least 80% and more preferably 90% of the frontal projection area of the vehicle and the wind turbine via the turbine mount can be attached or is mounted on the front of the vehicle and/or on a chassis in front of the vehicle front.

12 Claims, 17 Drawing Sheets

Figure 1:
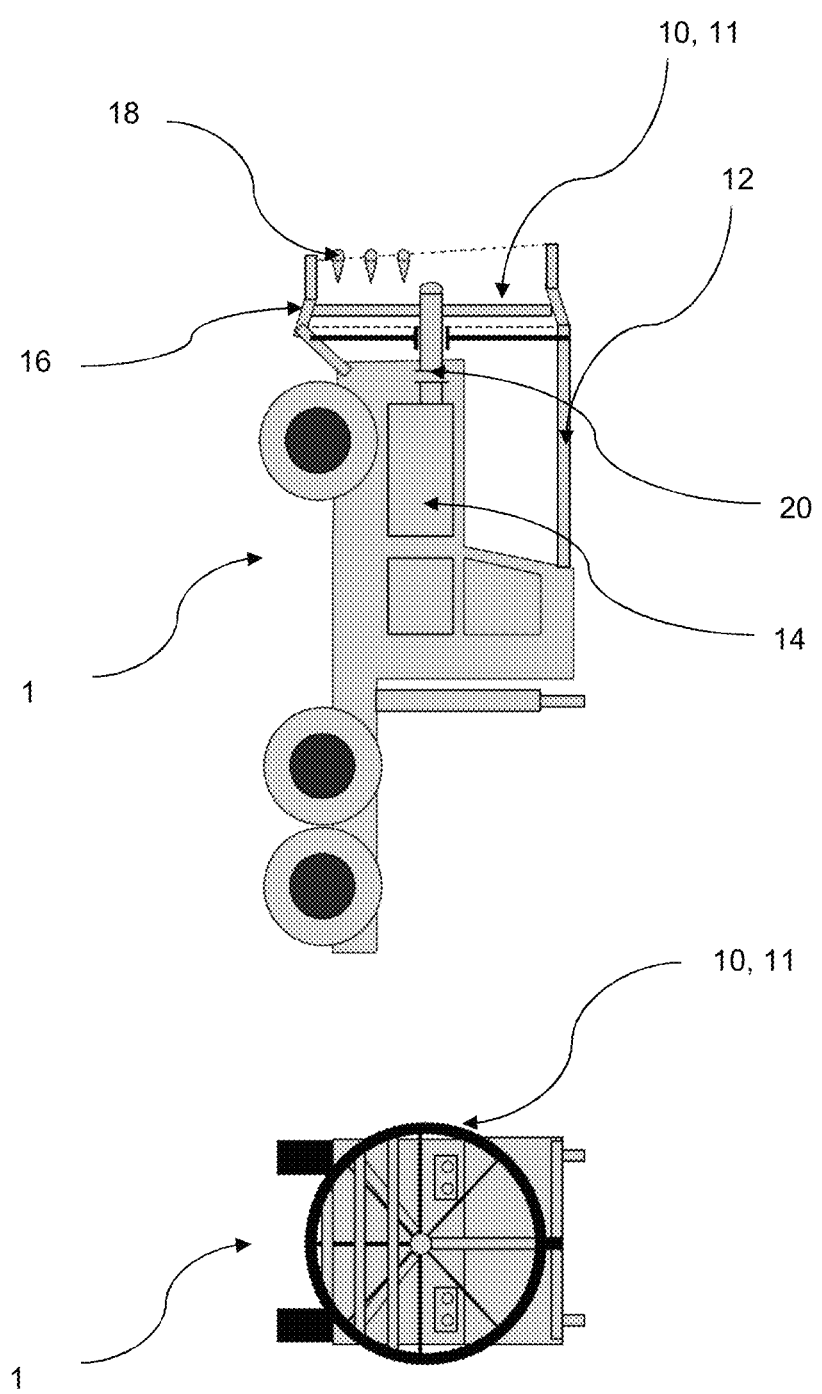

(51) Int. Cl.
*B60L 8/00* (2006.01)
*B61D 43/00* (2006.01)
*F03D 1/04* (2006.01)
*F01D 15/10* (2006.01)
*F03D 1/06* (2006.01)

(52) U.S. Cl.
CPC ....... *B60L 2200/26* (2013.01); *B60L 2200/36* (2013.01); *B60Y 2200/91* (2013.01); *B60Y 2200/92* (2013.01); *F05B 2220/706* (2013.01); *F05B 2240/14* (2013.01); *F05B 2240/221* (2013.01); *F05B 2240/941* (2013.01); *F05B 2250/12* (2013.01); *F05B 2250/324* (2013.01); *F05D 2220/76* (2013.01); *F05D 2240/90* (2013.01); *Y02E 10/728* (2013.01); *Y02T 10/7072* (2013.01); *Y02T 10/90* (2013.01)

(58) Field of Classification Search
CPC ............. B60Y 2200/91; B60L 2200/26; B60L 2200/10; B60L 2200/36; B60L 8/006
See application file for complete search history.

(56) References Cited

U.S. PATENT DOCUMENTS

| | | | |
|---|---|---|---|
| 1,903,307 A * | 4/1933 | Gillio | F03D 3/002 417/231 |
| 3,878,913 A * | 4/1975 | Lionts | B60K 1/00 180/2.2 |
| 3,970,163 A * | 7/1976 | Kinoshita | B60K 3/04 180/65.26 |
| 4,075,545 A * | 2/1978 | Haberer | B60K 1/04 322/35 |
| 4,132,282 A * | 1/1979 | Sparks | B60K 16/00 180/2.2 |
| 4,134,469 A * | 1/1979 | Davis | B60K 6/48 180/2.2 |
| 4,327,808 A * | 5/1982 | Howard | B62D 57/04 180/165 |
| 5,280,827 A * | 1/1994 | Taylor | B60K 1/04 180/165 |
| 5,760,515 A * | 6/1998 | Burns | F03D 9/00 310/115 |
| 5,920,127 A * | 7/1999 | Damron | B60K 16/00 290/44 |
| 7,147,438 B2 * | 12/2006 | DePaoli | F04D 29/362 416/3 |
| 7,165,804 B2 * | 1/2007 | Shahbazi | B62D 35/00 296/180.1 |
| 7,185,944 B2 * | 3/2007 | Shahbazi | B62D 35/00 296/180.1 |
| 7,652,389 B2 * | 1/2010 | Farmer | B60K 16/00 290/55 |
| 7,665,554 B1 * | 2/2010 | Walsh | B60K 16/00 180/2.2 |
| 7,789,182 B2 * | 9/2010 | Bradley | B60K 16/00 180/165 |
| 7,802,641 B2 * | 9/2010 | Friedmann | B60K 16/00 180/2.2 |
| 8,177,479 B2 * | 5/2012 | Watts | B60K 16/00 415/4.1 |
| 8,217,525 B2 * | 7/2012 | Reid | F03D 9/11 290/55 |
| 8,220,570 B1 * | 7/2012 | Knickerbocker | B60K 16/00 180/2.2 |
| 8,469,123 B1 * | 6/2013 | Knickerbocker | B60K 16/00 180/2.2 |
| 8,579,054 B2 * | 11/2013 | Knickerbocker | B60K 16/00 180/2.2 |
| 9,022,150 B2 * | 5/2015 | Cunico | F03D 1/02 180/2.2 |
| 9,228,563 B2 * | 1/2016 | Thomazios | F03D 9/00 |
| 9,731,608 B1 * | 8/2017 | Knickerbocker | B60L 8/006 |
| 2002/0066608 A1 * | 6/2002 | Guenard | B60K 1/00 180/65.22 |
| 2002/0153178 A1 * | 10/2002 | Limonius | B60L 8/006 180/2.2 |
| 2003/0132638 A1 * | 7/2003 | Simonsen | F03D 9/00 290/55 |
| 2005/0103537 A1 * | 5/2005 | Michaud | B60K 6/46 180/2.2 |
| 2005/0121242 A1 * | 6/2005 | Robinson | B60L 8/006 180/165 |
| 2005/0280664 A1 * | 12/2005 | DePaoli | F04D 29/362 347/5 |
| 2006/0113118 A1 * | 6/2006 | Kim | B60K 16/00 180/2.2 |
| 2006/0213697 A1 * | 9/2006 | Sutherland | B60K 6/46 180/2.2 |
| 2006/0272863 A1 * | 12/2006 | Donahue | B60K 16/00 180/2.2 |
| 2007/0039764 A1 * | 2/2007 | McBryde | B60K 16/00 180/2.2 |
| 2007/0107949 A1 * | 5/2007 | Bradley | F03D 9/32 180/2.2 |
| 2007/0163829 A1 * | 7/2007 | Ellis | F03D 3/002 180/165 |
| 2007/0240915 A1 * | 10/2007 | Tomoyasu | F03D 9/32 180/2.2 |
| 2007/0284155 A1 * | 12/2007 | Cong | B60K 16/00 180/2.2 |
| 2008/0011523 A1 * | 1/2008 | Packard | B60K 16/00 180/2.2 |
| 2008/0296907 A1 * | 12/2008 | Donahue | B60K 16/00 290/1 A |
| 2019/0016212 A1 * | 1/2019 | Albrecht | F03D 1/04 |

* cited by examiner

TURBINE SYSTEM FOR SAVING ENERGY IN A VEHICLE

PRIORITY APPLICATIONS

This application is a U. S. National Stage Filing under 35 U.S.C. 371 from International Application No. PCT/EP2017/050936, filed on 18 Jan. 2017 and published as WO/2017/125409 on 27 Jul. 2017, which claims the benefit of priority to German Patent Application No. 10 2016 100 716.1, filed on 18 Jan. 2016, and European Patent Application No. 16172177.4, filed on 31 May 2016, which applications and publications are incorporated herein by referenced in their entirety.

DESCRIPTION

The invention relates to a turbine system for saving energy in a vehicle.

BACKGROUND AND STATE OF THE ART

The potential use of wind energy in vehicles using wind turbines has inspired various inventions. Partially, this is a conversion of the kinetic airstream into usable electrical energy and its storage in batteries.

In DE202008015733U1 example, wind turbines are proposed, which can be mounted on roofs of vehicles, especially trains. While driving, the airstream propels the wind turbines connected to generators to generate electricity. Due to the attachment of the wind turbines on the roofs of the vehicles, however, the air resistance increases to a greater extent. In this design, the fuel consumption (energy) due to additional air resistance is higher than the electrical energy generated by the wind turbines. The overall energy balance and thus the fuel saving potential is therefore negative.

In DE20308468U1 an internal combustion engine/electric motor cars with complex generators is proposed, in which the airstream is used to generate electricity during deceleration of the vehicle. As a result, electricity can thus be generated without increased air resistance respectively without increased fuel consumption. However, the fuel saving potential is low due to these restrictive boundary conditions.

CH 700 463 A2 describes wind turbines for a vehicle which are driven by the airflow surrounding the vehicle while driving. The arrangement of the turbines on the vehicle such as on the mirrors or on the spoiler leads to increased flow losses. Furthermore, the power generation of the wind turbines is too small due to their small dimensions to lead to significant fuel savings.

US 2008/0011523 A1 describes a wind turbine in the front region of a commercial vehicle which covers a significant area of the vehicle front. The wind turbine is intended to convert some of the back pressure energy into mechanical energy without significantly increasing the vehicle's motion resistance. It is disadvantageous that lossy flows and turbulences occur, especially at the outer edge of the wind turbine. Furthermore, in US 2008/0011523 A1 only a moderate speed reduction of the air flowing to the vehicle front takes place, so that only a small fuel saving can be achieved.

In the known state of the art, the combination of wind turbines and a vehicle thus results in a fuel saving only under special boundary conditions, e.g. when the motion resistance of the vehicle is not significantly increased or when braking the vehicle, similar to an energy recovery generated by electric motors or none at all due to a strong increase in air resistance by the wind turbines. In particular, the known in the prior art embodiments of the wind turbines do not lead to complete coverage of the frontal projection of the vehicle and only to a moderate lowering of the airstream speed, which significantly reduces the effect of the aerodynamic resistance reduction on the vehicle. Even the partially small dimensions of the wind turbines lead to relatively large flow losses due to turbulence at the blade trailing edges. This is the case even if blades with a very good aerodynamic shape are chosen. Furthermore, in the prior art, the wind turbines are positioned at locations on the vehicle where they protrude far outside the vehicle boundary layer and thereby generate additional losses.

An object of the invention was thus to provide a system which overcomes the aforementioned disadvantages of the prior art. Another object of the invention was to provide a system which uses the airstream energetically to reduce fuel consumption for propulsion of the vehicle.

SUMMARY OF THE INVENTION

The object of the invention is achieved in a preferred embodiment by the independent claims. The dependent claims, as well as the embodiments of the description part relate to preferred embodiments of the invention.

In a preferred embodiment, the invention relates to a turbine system for fuel saving in a vehicle, the turbine system comprising a turbine, a turbine mount with a windshield, wherein the turbine and the windshield together have a cross-sectional area which is at least 60%, preferably at least 80% and more preferably, at least 90% of the frontal projection of the vehicle and the turbine by means of the turbine mount is attachable on the front of the vehicle and/or on a chassis in front of the vehicle front.

For the application of the turbine system for saving fuel in vehicles with a travel speed of up to about 400 km/h, a turbine is preferably understood to mean a wind turbine or a wind-driven wheel, which is driven by the airstream and thereby provides usable energy for the vehicle. Preferably, the wind turbine is driven for rotation in a forward movement of the vehicle. The rotational energy provided thereby can preferably either be transmitted mechanically to the drive shaft of the engine of the vehicle or preferably be converted into electrical energy. For the application of the turbine system to save fuel in vehicles with speeds greater than about 400 km/h, the task can be adopted by a self-propelled and to a defined cruising speed optimized gas turbine (preferably aero derivative), which works with a larger inlet pressure (Turbocharger principle) due to the existing airstream and thereby provides additional usable energy for the vehicle. It should be noted at this point that the energy-efficient use of a gas turbine in connection with the invention in specific applications, e.g. for high-speed trains makes already sense from 200 km/h.

The term "turbine" is preferably understood to mean the rotary fluid machinery which converts part of the kinetic energy of the air (flowing to the vehicle during the drive) into mechanical power, i. e. in particular transferred to the rotation of a shaft. This mechanical power in the form of the rotating shaft can be forwarded to the engine of the vehicle or serve for the generation of electric power. Preferred embodiments of the turbine are wind turbines or gas turbines (Aero-derivative). The central axis of the rotating components of the turbine, e.g. rotor blades, also called the axis of rotation.

The term "cross-sectional area of the turbine" is preferably understood to mean the projected area of revolution of the turbine which is generated by the projection of the turbine along the axis orientated vertically to the direction of rotation of the turbine. In the case of a wind turbine or a wind-driven wheel comprising rotor blades with a length L, the cross-sectional area corresponds preferably to $\pi L^2$. The length of the rotor blades preferably corresponds to the distance from the axis of rotation of the wind turbine to the end of the rotor blade furthest away from this axis (tip of the rotor blade). The cross-sectional area of the turbine thus does not correspond in the sense of the invention to the static cross-sectional area of the turbine at standstill but quantifies that area of the turbine which spans the turbine during the rotation.

The term "cross-sectional area of the windshield and the turbine" is preferably understood to mean the area which is spanned together by the windshield and the turbine. Since the windshield surrounds the turbine in cross-section to the direction of travel, the common cross-sectional area of the windshield and the turbine preferably corresponds to the transverse area which is spanned by the outer contour of the windshield. Particularly preferred, the windshield is e.g. here, an annular housing which surrounds the turbine. Thereby, the inner diameter of the windshield is greater than the outer diameter of the turbine, which, in the case of a wind turbine, corresponds to the length of the rotor blades. The outer contour of the annular windshield spans the common cross-sectional area. It is the cross-sectional area of the windshield and the turbine, which, in the context of the invention, should ensure the most complete possible coverage of the vehicle front.

For the purposes of the invention, the "vehicle front" is preferably the component of the vehicle which is located in the forward direction of the vehicle. Preferably, the term vehicle front comprises the entire front area of the vehicle on which the airstream is acting while the vehicle is moving.

For the purposes of the invention, the term "the frontal projection area of the vehicle" preferably denotes that area which the vehicle has when a two-dimensional projection of the vehicle takes place along the axis of the locomotion of the vehicle. The frontal projection area of the vehicle in the sense of the invention is therefore preferably a quantification of the frontal area of the vehicle on which the airstream acts during the travel.

In the movement of known vehicle without a turbine according to the invention, there is a generation of back pressure ("referred also as dynamic head, dynamic pressure increase") in front of the vehicle front. The back pressure in the sense of the invention preferably designates an increase of the ("dynamic") pressure in front of the vehicle front as a function of the driving speed. The back pressure counteracts the vehicle movement and thus increases the resistance forces which the engine drive must perform in order to enable a forward movement (see Equation 1).

According to the invention, the minimum size of the cross-sectional area of the turbine and the windshield compared to the frontal projection area of the vehicle leads to a surprising reduction of back pressure and thus to a surprising slowing down of the airstream. As you drive, the air masses hit the turbine and windshield instead of the vehicle front. When driving, the turbine is taken kinetic energy from the flowing air which results in a low speed downstream in front of the vehicle front and ensures a low back pressure. This effect is further enhanced by the windshield. As the sloweddown air volume widens further in the slipstream area and the high-energy airstream is kept away from the vehicle surface, the slowed-down layers of air encase the entire vehicle as a drag-reducing "bubble of air". In particular, much smaller aerodynamic losses, e.g. turbulences occur by a substantial slow flow around the vehicle along and at the rear edge of the vehicle. This is accompanied by a reduction of the airstream resistance force, which is greater in magnitude than the newly generated turbine axial forces and thus leads to a reduction of the total aerodynamic motion resistance force especially for the front of commercial trucks (Cd value approx. 0.65). Surprisingly, this already leads, without the use of a wind turbine power, to a fuel saving in vehicles which use the turbine system according to the invention. Such a reduction of the total aerodynamic motion resistance force, among others, caused by a slowed airflow around the vehicle and a reduced back pressure, could not be expected by a person skilled in the art. In particular, the wind turbines, which are known from the prior art, can only slowed down the airflow to a limited extend and cover only a portion of the projection of the vehicle fronts. The reduction of the aerodynamic resistance, for example, by a slowed down airflow at the vehicle end is thereby considerably restricted and thus only a very small energy saving is achieved.

In the prior art, a significant decrease in airstream resistance force on the vehicle is always coupled with a significant increase in wind turbine axial forces. Especially with small $C_w$ values, the wind turbine axial forces significantly exceed the saved airstream resistance force (see FIG. 17). The windshield used in the invention leads to a clear decoupling of wind turbine axial force and airstream resistance force of the vehicle.

The fuel saving by the turbine according to the invention with a minimum size and the associated windshield represents a departure from the prior art and is a surprising effect, which has been recognized according to the invention.

The significant fuel saving by the turbine system is preferably achieved due to the combination of three physical principles involved.

The first principle is based on the conversion of part of the kinetic energy contained in the airstream into mechanical energy, e.g. by a wind turbine at speeds up to approximately 400 km/h. At speeds greater than preferred 400 km/h to about 1000 km/h, the energy conversion is feasible by e.g. an axial gas turbine for power generation. In a wind turbine at speeds up to about 400 km/h, the mechanical energy preferably forwarded to the vehicle engine and relieves this directly. This leads to significant fuel savings. Moreover, in the case of an axial gas turbine, the mechanical energy can be used to generate electricity and also lead to fuel reduction in vehicles powered by electricity.

The second principle is based on a reduction of the flow losses due to a reduced back pressure on the vehicle front generated by the turbine and a slowed down airflow to the vehicle generated by the turbine and the windshield. Advantageously, the resistance force, which the vehicle have to overcome against the airstream, is considerably reduced by the reduction of the back pressure and the slowing down of the air masses in front of the vehicle front. This is a surprising effect of the turbine system according to the invention. The air resistance is not increased against the front of the vehicle, but advantageously reduced even though additional components, the turbine and the windshield, are included.

The third principle is based on a consideration of the total axial force, i.e. the acting forces in the direction of travel.

The axial total force with and without the use of the wind turbine and the windshield—especially for vehicles with a $C_d$ value of approximately 0.6—remains approximately the same. That is, using a turbine system according to the invention, the saved axial air resistance forces and the additional axially generated flow forces due to the wind turbine are compensated. Due to a passing of the mechanical rotational energy of the wind turbine to the vehicle engine, a particularly significant fuel saving can be achieved at these speeds. For vehicles with a $C_w$ value greater than about 0.6, the total force can even be reduced when using the wind turbine. For vehicles with a $C_w$ value less than about 0.6, the total force may increase with the use of the wind turbine and the windshield, so that fuel savings in this case can be achieved by utilizing the mechanical rotational energy of the wind turbine e.g. can be achieved by coupling in the vehicle engine or by generating electrical power and discharge other consumers.

For the purposes of the invention, the term "of about", "approx.", "almost", "approximately" or synonymous terms is preferably understood to mean an indication of values, forms or other descriptions of technical features which include both the exact indication and an indication with a tolerance range. For qualitative features, the tolerance range is defined by the knowledge of the average person skilled in the art, in particular, with regard to the functionality of the technical feature. For quantitative features, such as e.g. the indication of approximate values, the intended tolerance range is preferably ±10%, more preferably ±5%. As a most preferred embodiment, an approximate indication always discloses also the exact indication. If the indication of about 5 is given in addition to values which are within a margin of tolerance (e.g., 5.1, 4.9, etc.), than the exact value 5 is also always disclosed.

At forward speeds from preferably 400 km/h (in special applications also already from 200 km/h) to preferably 1000 km/h when using a turbine system comprising a gas turbine (Aero derivative) and windshield, the fuel consumption will be significantly smaller than in a vehicle without turbine system. This is mainly due to the low-energy exhaust stream of the gas turbine (Aero derivative), which leads to a reduced back pressure on the vehicle front and significantly reduces the aerodynamic resistance along the vehicle surface. Surprisingly, the gas turbine (aero derivative) does not increase the air resistance of the vehicle, but reduces it. In addition, the improved efficiency of the gas turbine (Aero derivative) can be used in electrically powered vehicles, such as trains, to reduce the fuel.

For the purposes of the invention, the term "fuel economy" is preferably understood to mean an increase in energy efficiency for driving the vehicle. According to the invention this is achieved by reducing the back pressure on the vehicle front due to the presence of both, the windshield and the turbine according to the invention, as well as an use of the energy provided by the turbine. For example, to utilize the energy provided by the turbine, the mechanical energy may be coupled directly to an engine of the vehicle. However, it may also be preferred that the turbine converts the mechanical energy of the airflow into electrical power and the generated electrical power is used to drive the vehicle. In this case "fuel" corresponds to the electrical energy to drive the vehicle. However, it may also be preferred that the energy provided by the turbine be used indirectly to save fuel. For example, the turbine can generate electrical current, which is used by devices of the vehicle, such as radios, refrigerators, etc. Without the turbine, electrical power would be provided by the engine of the vehicle to operate this equipment. For this reason, for example, in trucks with a diesel engine, additional diesel fuel is consumed. By the independent power supply of electrical equipment by means of the turbine, the engine can be relieved. This also leads to a fuel saving in the sense of the invention. Thus, for the purposes of the invention, the fuel economy may also be characterized by the provision of usable energy by the turbine, the usable energy being greater than any energy lost due to additional flow resistance of the turbine.

The term "usable energy" is preferably understood to mean any form of energy which leads directly or indirectly to the fuel saving of the vehicle. According to the invention, the turbine at least partially converts the mechanical energy of the incoming airstream into usable energy, thereby increasing the energy efficiency of the overall system of vehicle and turbine.

Figure 15:
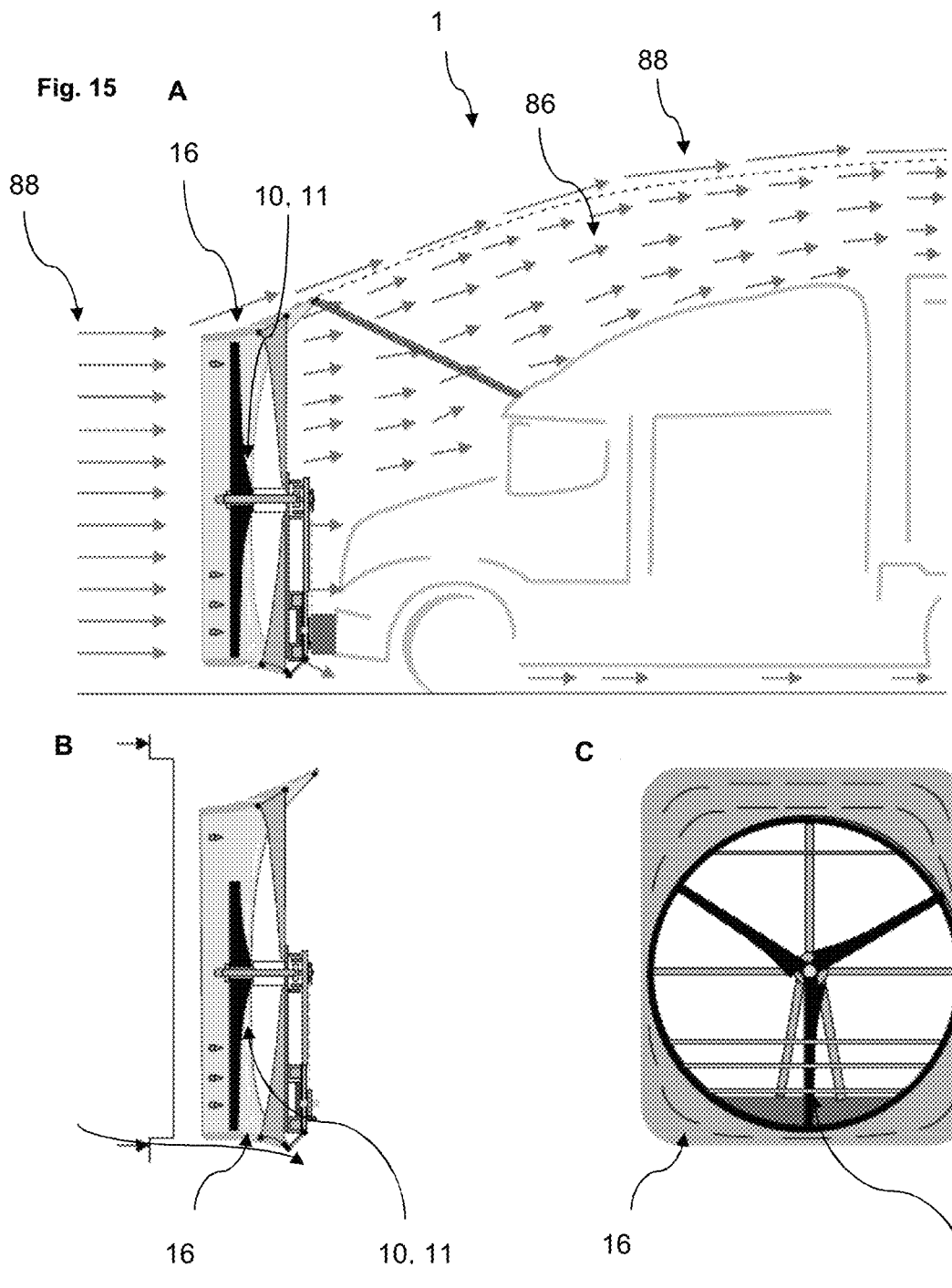

A significant advantage of the invention over the prior art is furthermore the low speed of the slipstream airflow, which is nearly adjustable independently of the operating condition of the turbine (see FIG. 15). As a slipstream airflow is preferably referred to the airflow, which impinges the vehicle front after passing the turbine and encases the vehicle. A low velocity of the slipstream airflow on the vehicle produces significantly smaller flow losses, e.g. due to a much smaller wake area at the vehicle end. The invention still provides a sufficiently large reduction in slipstream speed, even at low turbine power, and thus differs significantly from the prior art. This is particularly important if the motion resistance of the vehicle with and without this device is unlikely to increase.

Figure 16:
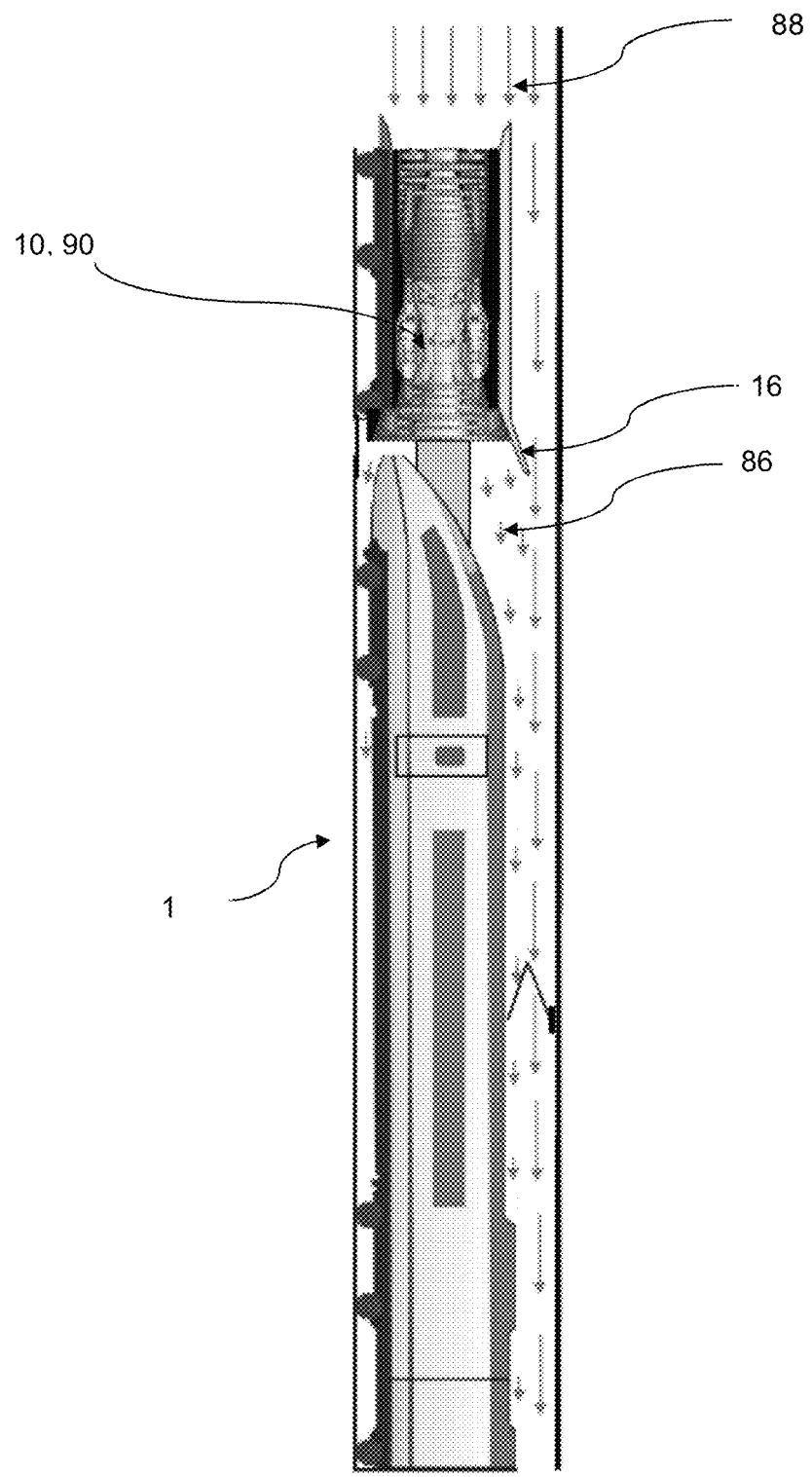

The turbine system for this purpose comprises as a main component the so-called windshield with e.g. integrated wind turbine or gas turbine (aeroderivative), which are mounted in the front area of the vehicle in such a way that as far as possible both components cover the entire frontal projection area of the vehicle (see FIG. 15 and FIG. 16).

A single wind turbine, respectively a gas turbine, with maximum possible diameter with respect to the size of the vehicle front has smaller flow losses due to physical laws than several smaller turbines, and thus is preferred to a composite of smaller diameter turbines.

Due to the windshield, a portion of the high-energy airstream, also referred to as energy airflow, is directed past the vehicle, while the other high-energy component flows through the turbine and fills up the volume on the lee side, i.e. the back, of the windshield. The airflow which flows through the turbine is preferably referred to as slipstream airflow. Energy and slipstream airflows have a significant speed difference immediately downstream of the windshield, which is primarily due to a significant speed reduction in slipstream airflow in the vehicle frame of reference (see FIG. 15).

The speed reduction is achieved here on the one hand by the conversion of kinetic usable energy when passing the turbine and on the other hand to a considerable extent by the significant widening of the slipstream airflow on the rear side of the windshield. At the axial position of the rotor blade leading edge, the diameter of the windshield inside should preferably be at least equal to the outer diameter of the turbine and increases further downstream, such that the resulting airflow is similar as close as possible to the natural streamlines along a wind-driven wind turbine without a windshield. Furthermore, both, the inside and outside of the windshield should be designed as aerodynamically as possible so that both, the energy airflow and the slipstream airflow can be deflected lossless and a low-noise and low-vortex merger of both air streams (shear layer) can be ensured at the trailing edge.

In order to ensure a particularly low-separated and low-vortex flow downstream of a turbine, various other aerodynamic measures can be used.

Particularly preferred measures to ensure a low-separated expansion of the slipstream airflow are, for example:

Attachment of louvers on the windshield in order to guide high-energy flow (energy airflow) to points which are prone to separate or to suck (venturi effect) low-energy flow (slipstream airflow) at points which are prone to separate Rotor blade tip blowing (similar to the Enfield-Andreau rotor)

Limitation of the expansion angle

Preferred measures to ensure a low-vortex flow include, for example:

High speed number (ratio rotor blade tip to air speed) between 4-7

Attaching fins to the inside of the windshield

Installation of aerodynamic profile struts downstream for flow deflection and introduction of the windshield forces into the wind turbine suspension Attaching fins on the outside of the windshield, in particular for the adjustment of the residual vortex of the slipstream airflow or at a co-rotating windshield The person skilled in the art knows how the turbine system according to the invention can be configured with the abovementioned measures in order to ensure a particularly low-separated and low-vortex flow.

Another advantage of the windshield is also a safety function. In the case of breakage of rotating parts of the turbine e.g. a wind turbine blade, it is prevented by the windshield that parts are uncontrollably thrown into the environment due to centrifugal force.

Based on a case study, it will be shown below with the aid of the turbine system according to the invention, how an area with a slow slipstream airflow can be developed around the vehicle, in particular under a large number of boundary conditions. This presents a significant difference and advantage over prior art wind turbines, which are known e.g. from US2008/0011523 A1 and which have no windshield.

The motion resistance of a vehicle without a turbine system is composed of essentially the following components:

Rolling resistance,

Air stream resistance of the vehicle (air drag).

In a vehicle with a turbine system according to the invention, two further components are added:

Air stream resistance of the windshield

Axial aerodynamic forces of the wind turbine (portion of the airstream resistance of the wind turbine)

If the motion resistance of the vehicle is unlikely to increase at an assumed constant vehicle speed with and without the turbine system, then the additional two resistance components should be compensated. This means that the airstream resistance of the windshield and the axial aerodynamic forces of the wind turbine should be preferably compensated by the ("saved") airstream resistance of the vehicle. The rolling resistance is not suitable for this because it is independent of the presence of a turbine system.

The airstream resistance of a vehicle can be lowered significantly with the aid of the turbine system according to the invention, whereby lowering always takes place independently of the $C_w$ value of the vehicle. It should be noted, however, that the saved amount of the airstream resistance is greater for vehicles with a large $C_w$ value than for vehicles with a smaller $C_w$ value.

Consequently, in order to maintain a constant motion resistance of the vehicle, the aerodynamic axial forces of the wind turbine (lift forces respectively airstream resistance portion of the wind turbine) must be adjusted accordingly. These are heavily dependent on the power output of the wind turbine. At high power output of the wind turbine, the aerodynamic axial forces of the wind turbine significantly increase, which are compensated only by a similar airstream resistance value (magnitude) of the vehicle with a turbine system according to the invention again. At a high $C_w$ value, the airstream resistance savings are high with the turbine system of the present invention, so that, as assumed in this case, it can just balance the axial aerodynamic forces at maximum wind turbine power, thus maintaining the above requirement.

At a small $C_w$ value, the airstream resistance saving is smaller in magnitude than at a large $C_w$ value, and accordingly, the output of the wind turbine must be smaller in order to meet the above requirement. The speed of the slipstream airflow is thereby affected only insignificantly, because the airflow is slowed down to a considerable extent by means of the windshield, by expanding it. As a result, even with smaller wind turbine power, a significant airstream resistance reduction of the vehicle can be achieved by means of the invention.

If you now carry out this case study with a vehicle with and without a turbine system that does not have a windshield, then you notice a fundamental difference.

Without a windshield, only the wind turbine is used to form a slipstream area. In this case, the two parameters airstream resistance of the vehicle and aerodynamic axial forces of the wind turbine (airstream resistance portion of the wind turbine) are highly dependent on each other (see FIG. 17). As a result, the airstream resistance can no longer be lowered independently of the $C_w$ value, while maintaining a constant motion resistance of the vehicle.

Especially with a small $C_w$ value, a "vicious circle" arises when using turbine systems without an inventive wind shield, so that the above mentioned requirement can no longer be met. The low airstream resistance is already small and can only be further reduced by a significant reduction in slipstream airflow speed (see FIG. 17).

Figure 17:
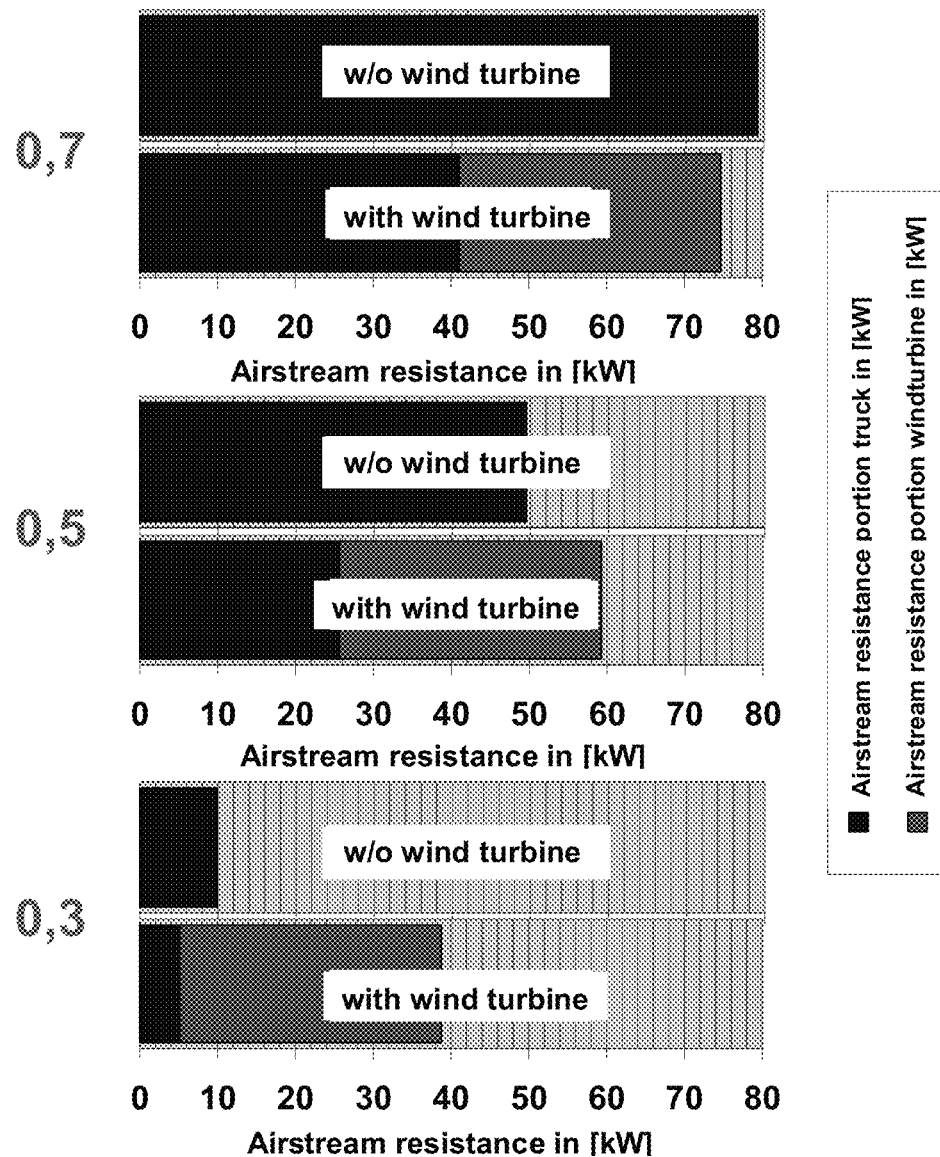

Without violating the above-mentioned requirement of a constant motion resistance, these boundary conditions cannot be set by means of a turbine system without a windshield, because the slipstream airflow speed can be significantly reduced only by a large wind turbine power. At the same time, however, this leads to a significant increase in the aerodynamic axial forces of the wind turbine (airstream resistance portion of the wind turbine).

the airstream resistance savings are too small at a small $C_w$ value, as these could compensate the occurring aerodynamic axial forces of the wind turbine (airstream resistance of the wind turbine, see FIG. 17).

In order to be able to afford a certain compensation contribution by a saved airstream resistance at a low $C_w$ value, the wind turbine would have to run at maximum power, but this would lead to a significant increase in the motion resistance of the vehicle due to the high aerodynamic axial forces of the wind turbine.

A turbine system without a windshield can only meet the above requirement if the wind turbine delivers a minimum of power. In that case, the aerodynamic axial force of the wind turbine is also minimal with optimum blade position and does not result in a significant increase in the motion resistance of the vehicle. Generation of a low slip stream airflow speed is no longer achievable with a turbine system without a windshield under these conditions.

In a preferred embodiment of the invention, the turbine is characterized in that the turbine has a diameter between 32% and 120%, preferably between 80 and 100% of the width of the frontal projection area of the vehicle. For the purposes of the invention, the diameter of the turbine is preferably understood to mean the circular area which the turbine spans during the rotation. In the case of a wind turbine, for example, the diameter of the turbine preferably corresponds to twice the distance of the tip of a rotor blade from the central axis of rotation of the wind turbine. The width of the vehicle front according to the invention preferably corresponds to the extent of the frontal projection of the vehicle transversely to the direction of travel of the vehicle. The height of vehicle front (perpendicular to the width) is preferably understood to mean the extension along the axis marked by the gravity from top to bottom. For a vehicle such as a truck with a width of the vehicle front (including the outside mirrors) of 3 m and a height of 4.5 m, the diameter of the wind turbine in the preferred embodiment is preferably between 1 m and 3.6 m, and more preferably between 2.4 m and 3 m. The preferred dimensions of the wind turbine, a particularly effective reduction of back pressure and a large wind turbine performance can be achieved. The windshield preferably surrounds the turbine in cross-section, so that the inner diameter of the windshield at the axial position of the rotor blade leading edge is preferably between 0.1 cm and 30 cm larger than the outer diameter of the turbine.

In a preferred embodiment of the invention, the turbine and the windshield is characterized in that the two components together have a cross-sectional area between 60% and 140%, preferably 80% to 110% of the frontal projection area of the vehicle. The windshield ensures a holistic airstream shielding of various vehicle shapes. While the windshield is preferably an annular housing, it can also be adapted to the vehicle front by the shape. With a windshield of the aforementioned dimensions, part of the high-energy airstream is directed past the vehicle in a particularly effective manner (energy airflow) while the other high-energy component flows through the turbine and fills the volume on the lee side (rear side) of the windshield (slipstream airflow). The speed reduction of the slipstream airflow is not only achieved by the conversion of kinetic energy into usable energy as it passes the turbine but also to a significant degree by the expansion of the slipstream airflow at the rear of the windshield.

In a preferred embodiment, the turbine system is characterized in that the windshield is an annular housing which surrounds the turbine and has an outer contour, whose distance to the axis of rotation increases to the vehicle facing side. For the purposes of the invention, an annular housing preferably means that the windshield in the frontal view has a ring-like shape, with an inner diameter and a not necessarily circular outer contour, wherein the inner diameter of the windshield is greater than the outer diameter of the turbine, so that the turbine is framed in cross-section by the annular windshield. In the case of a wind turbine, the inner diameter of the windshield at the axial position of the rotor blade leading edge is thus greater than the length of the rotor blades. The circumferentially varying ring width ("thickness") of the annular windshield preferably corresponds to the difference between the minimum inner diameter and the outer contour edge, which is at a maximum distance away from the wind turbine axis, at the respective circumferential position. It is preferred that the inside of the windshield front is circular, however, merges into a non-circular inner contour further downstream (toward the vehicle), whose distance to the wind turbine axis is also increased towards the vehicle-facing side.

The growth of the inner and/or outer contour of the windshield preferably means an increase in the radial distance to the axis of rotation of the turbine (wind turbine axis) along the direction of travel. In the transverse view, the outer contour of the windshield is thus characterized by a radial increase of the outer contour at the respective circumferential position from a front, minimum distance to a rear (the vehicle facing) maximum distance relative to the wind turbine axis. The same applies to the case of a wind turbine preferably for the inner contour, preferably from the axial position, which are located downstream of the rotor blade leading edge. The increase is preferably continuous monotonous and can be linear in sections. The radial increase of the inner and/or outer contour characterizes a pitch angle from the front to the rear end of the windshield at the respective circumferential position, which affects both, the expansion of the slipstream airflow respectively the energy airflow flowing to the vehicle front. The profile of the inner contour along the axial direction of travel at each circumferential position is preferably shaped such that it is as similar as possible to the natural stream tube boundary (flow path) of an operated wind turbine in the open field. The stream tube boundary in this case means (under stationary boundary conditions) an imaginary tube with a cross-sectional area at each axial position, through which always flows those air particles which will flow through the wind turbine (stream tube upstream of the wind turbine) respectively has already flown through the wind turbine (flow tube downstream of the wind turbine). As a result, both the slipstream airflow and the energy airflow are expanded or deflected without significant loss. The initiation of the windshield forces into the wind turbine mount should preferably be done with aerodynamic profile struts, which can be used simultaneously for vortex reduction, to ensure a low-vortex guidance of the airflows along the vehicle.

In a preferred embodiment of the invention, the turbine system is characterized in that the growth of the outer contour of the windshield is characterized by a pitch angle of 5° to 35°. The pitch angle corresponds to the angle of the radial increase of the outer contour of the windshield along the axial direction of travel at the respective circumferential position. The pitch angle is thus calculated preferably from the difference between the two distances from the rear, maximum respectively the front, minimum distance of the outer contour edge to the wind turbine axis with respect to the axial extent of the windshield, i.e. the extent along the direction of travel. The preferred pitch angle has been surprisingly aerodynamic and results in a particularly effective slipstream effect. The pitch angle may lead, preferably at the windshield trailing edge and at the respective circumferential position, to a corresponding outflow angle for the energy airflow, which deflected it far enough from the vehicle surface to all sides, that an annular flow passage for the slipstream airflow exists with a preferably at least 1.2 times wind turbine projection area at the axial position with the largest cross-sectional extent of the flow passage and the vehicle.

In a preferred embodiment of the turbine system, the outer contour of the windshield in the frontal projection is not circular, but adapted to the shape of the frontal projection area of the vehicle front and preferably forms a rounded rectangle. The outer contour in the frontal projection preferably corresponds to the maximum outer contour of the windshield on the vehicle facing side. In the preferred embodiment, the outer contour is adapted to the shape of the vehicle front to be shielded. Preferably, the adaptation designates a nearly congruent image of the vehicle front, wherein smoothing of the outer contour can be aerodynamically favorable. For example, many trucks have a nearly rectangular vehicle front, which is broken through by, for example, overhanging side mirrors or antennas. In that case, it is particularly preferred to choose a rounded rectangle as the outer contour in order to achieve the greatest possible shielding of the vehicle front. According to the invention, it has been recognized that a particularly aerodynamic embodiment of the windshield is achieved precisely by a not necessarily circular outer contour. Instead, an adaptation to the vehicle front can be realized preferably by means of a rounded rectangle. The rounding of the rectangle occurs at the corners to minimize flow peaks and vortex.

By this embodiment, a particularly high coverage of the vehicle front of preferably more than 90% can be achieved. As a result, an energetically particularly favorable airstream shield is achieved. The embodiment is thus characterized by excellent results in terms of fuel economy.

The dimensions of the windshield are preferably adapted to the vehicle front. For a truck, for example, a difference of the rear, maximum outer contour edge to the front, minimum outer contour edge at the respective circumferential position between 10 and 50 cm may be preferred, while the axial extent is between 30 cm and 130 cm. The preferred dimensioning allows a particularly lossless expansion of the incoming air.

In a preferred embodiment of the invention, the turbine is a wind turbine. For the purposes of the invention, the wind turbine comprises a rotor, preferably comprising one or more rotor blades, which are set in rotation by the airstream. On the one hand, the rotational energy can be transmitted as usable energy mechanically to the engine of the vehicle. On the other hand, the rotational energy can be used by means of a generator to provide electrical power. In addition, a wind turbine, especially in conjunction with the windshield, allows a reduction of the slipstream airflow that flows to the front of the vehicle.

In a preferred embodiment of the invention, the wind turbine is characterized in that it features 1 to 7, preferably 2 to 4 and more preferably 3 rotor blades. Preferably, in this preferred embodiment, the wind turbine comprises a hub, to which the radial extended rotor blades are attached preferably with a hinged joint. This avoids the transmission of bending moments on the shaft due to unequal forces on the individual rotors. Due to the airflow, the rotor blades are set in rotation, whereby the airflow energy is removed and the back pressure can be reduced in front of the vehicle front. The person skilled in a number of different forms of rotor blades are known, which can preferably be used for converting the energy of the air stream into usable energy, for example in electrical power. Aerodynamic forms of rotor blades, as used for example for wind turbines, are preferably also suitable for the turbine system according to the invention for saving fuel. For the preferred number of rotor blades, there is a particularly effective reduction of the back pressure and a slower slipstream airflow. Furthermore, by the preferred number of rotor blades, the noise development as well as a potential impairment of visibility can be reduced particularly effectively. If the 3 rotor blades are still connected to a shroud (to reduce the blade tip losses), in comparison to a 2-blade rotor, their torsional stiffness also increases, which ensures increased stability and low susceptibility to interference.

In a particularly preferred embodiment of the invention, the turbine system is characterized in that the distance between the wind turbine and the vehicle front is between 10-200%, preferably between 20% and 90% and particularly preferably between 30% and 80% of the diameter of the wind turbine. The distance of the turbine from the vehicle front preferably corresponds to the distance between the direction of travel in the rear end of the turbine and the front end of the vehicle front. The distance of the turbine from the vehicle front also determines the distance of the windshield, which preferably surrounds the turbine in cross-section.

The preferred distances of the wind turbine from the front of the vehicle lead to a particularly effective reduction of the back pressure in front of the vehicle front. Distances of the wind turbine, which are smaller than 200%, preferably 90% and particularly preferably 80% of the diameter of the wind turbine produce a particularly pronounced slipstream. This means that due to the presence of the turbine, in particular together with the windshield, the speed of the airflow directly in front of the vehicle front is reduced to a particularly high degree at the preferred distances and thus the back pressure on the moving vehicle is reduced. At a distance of the turbine, which is smaller than 10% of the diameter of the turbine, there may be strong turbulence between the turbine and the vehicle front. As a result, a smaller uniform reduction of the airflow may occur at smaller distances, so that the effect of the fuel saving according to the invention is smaller than in the preferred ranges. Surprisingly, it can be achieved by the use of a turbine, in particular for the preferably mentioned distances from the vehicle front, that the $c_w$ value of the vehicle is almost the same or even reduced with turbine system when compared to a vehicle system without turbine system. For the purposes of the invention, the $c_w$ value preferably designates the flow resistance coefficient. The $c_w$ value is a dimensionless parameter that gives the ratio of the resistance of the vehicle against the airflow and the product of the back pressure of the incoming air and reference area of the vehicle front. For the purposes of the invention, the $c_w$ value thus preferably quantifies the resistance force which a vehicle must overcome in order to move against an airflow. The $c_w$ value preferably represents a measure of the air resistance of the system of vehicle and turbine system or of the vehicle only as a comparison value of the known state of the art. According to the invention, in particular in combination with the turbine and the windshield, the speed of the airflow acting on the vehicle front, is reduced and thus the back pressure is reduced, too. Due to the reduced airflow and reduction of the back pressure, the $c_w$ value of the overall system is thus advantageously reduced in the sense of the invention. Surprisingly, for a vehicle with a turbine system, the $c_w$ value is either nearly equal to a vehicle without a turbine system (for vehicles with a $c_w$ value of about 0.6) or even reduced (for vehicles with a $c_w$ value greater than about 0.6). This represents a surprising effect which could not be expected by a person skilled in the art. In particular, the energy efficiency of a vehicle with a turbine system can be increased in a surprising manner. The wind turbine extracts energy from the air entering the front of the vehicle, which is converted into usable energy. The usable energy can be provided, for example, by a mechanical coupling of the wind turbine to the engine or by the generation of electrical current. According to the invention, it has been recognized that the back pressure is reduced directly in front of the vehicle, the total $c_w$ value of the system comprising the vehicle and the windshield, including the wind turbine, is advantageously approximately the same, increased in a negligible manner or even reduced. At the presence of the turbine in combination with the windshield, little or no additional energy is needed for the movement of the vehicle against the air resistance so that the total energy balance is positive due to the provided usable energy of the turbine system. According to the invented turbine system, in particular in the preferred embodiment, particularly high energy efficiency can thus be achieved and fuel can be saved effectively.

In a preferred embodiment of the invention, the turbine system comprises a torque transmission unit, with which the torque of the wind turbine can be mechanically coupled to a rotary shaft of the engine of the vehicle. While the wind turbine is being driven to rotate by the airstream, the mechanical coupling may directly transfer the rotational energy to the drive shaft of the vehicle. As a result, the engine is relieved and fuel for driving the engine and for the movement of the vehicle can be saved. It was completely surprising that this preferred embodiment can achieve a particularly high level of fuel savings. Surprisingly, there are only very small energy losses when transmitting the mechanical energy from the wind turbine to the engine. The preferred variant is thus characterized by a particularly high efficiency coefficient and, moreover, can be carried out in a surprisingly simple manner.

In a preferred embodiment of the invention, the mechanical coupling of the wind turbine with the engine of the vehicle is realized by the torque transmission unit comprising a centrifugal clutch with integrated freewheel. Advantageously, speed increase on engine-side, such as occurs when accelerating the vehicle, is not transmitted to the wind turbine. Instead, the preferred embodiment ensures that mechanical energy is transmitted only from the rotating wind turbine to the engine only at a sufficiently high speed and not in the opposite direction. However, other embodiments are also known to the person skilled in the art in order to achieve a mechanical coupling of the wind turbine to the engine of the vehicle, which leads to a particularly effective fuel saving.

In a preferred embodiment of the invention, the turbine system includes a generator whereas the turbine drives the generator to generate electrical power. For the purposes of the invention, a generator preferably denotes a device which can generate electrical current from the mechanical energy provided by the turbine, preferably as rotational energy. The person skilled in the art is familiar with the principle of operation of generators, so that a person skilled in the art is capable of choosing a suitable generator for the generator selected use. For example, a permanent magnet 3-phase A.C. (for example in the version with 420V or 230V output voltage and an output power of 25 kW-55 kW) may be suitable for positioning in the hub area. These generators allow a particularly efficient conversion of the rotational energy provided by the turbine into electrical current and thus have an increased efficiency. A ring generator could also be considered if it is integrated in the turbine mount and the rotor blade wing tips have been adjusted accordingly.

Due to the use of generators, the turbine preferably does not convert the airstream energy into rotational energy for directly driving a mechanically coupled engine but serves it to generate electric power. The power generated thereby represents a useful energy in the context of the invention, which can be used in various ways to save fuel. It may be preferred that the electrical energy is stored in a battery.

In a preferred embodiment of the invention, the vehicle comprises an electric motor and/or a hybrid engine and the electrical current generated by the generator is provided for driving the electric motor and/or the hybrid motor. For the purposes of the invention, an electric motor is preferably a device which converts, for the person skilled in the art in a known manner, electrical energy into mechanical energy to drive the vehicle. For the purposes of the invention, a hybrid engine is preferably understood to mean an engine which, in addition to an electric motor, comprises an internal combustion engine, such as a gasoline engine, a diesel engine or a gas engine. In this embodiment, electrical energy is thus used directly either by an electric motor or by a hybrid motor to drive the vehicle. Advantageously, electrical power is provided by the turbine, which relieves the electric motor or the hybrid engine. In this preferred embodiment, usable energy is thus provided by the turbine system in the form of electrical current, which leads directly to a fuel saving for the movement of the vehicle.

In a preferred embodiment of the invention, the vehicle comprises electrical devices preferably selected from a group comprising the air conditioning system, music system, refrigeration unit, on-board computer, lighting means, navigation device, TV set and/or driver assistance system, and the electric power is provided for operation of one or more electrical devices. Advantageously, in this preferred embodiment, usable energy is provided by the turbine according to the invention for the operation of one or more electrical devices of the vehicle. As a result, a direct fuel saving can be achieved in the context of the invention. So it is common in the art that the electrical equipments of the vehicles are driven by means of a generator. In the case of a vehicle with an internal combustion engine, such a generator is also preferably referred to as an alternator. By providing electrical current through the turbine according to the invention, the motor which drives the generator can thus be directly relieved. Thus, the turbine of the invention can lead to fuel saving even for a vehicle with an internal combustion engine using a generator. It may also be preferred in the context of the invention that not the fuel for driving the engine of the vehicle is saved, but for example, the fuel for operating one of the electrical devices, such as a cooling unit comprising a diesel engine. In this case too, the use of the turbine system advantageously increases the energy efficiency of the entire system comprising the vehicle, electrical equipment and the turbine system.

In a preferred embodiment of the invention, the turbine is a gas turbine, preferably an aero derivative for generating electric power. An aero derivative such as the RB211 from Siemens (aeroderivative gas turbine industrial RB211) represents the type of gas turbine which is particularly preferred for the turbine system. Those skilled in the art will recognize that other aero derivatives of similar constructions may also be preferred. The industrial gas turbine RB211 differs from the actual aircraft engine RB211 (Rolls-Royce plc) among others by additionally installed turbine stages, which should convert as much as possible the total kinetic energy within the airflow into mechanical or electrical energy. The electrical output (continuous operation) is approx. 32 MW. For the use of the industrial gas turbine RB211 as a turbine, it should preferably be equipped, inter alia, with an aerodynamically optimized nacelle, similar to aircraft engines. In addition, it would have to be equipped with, for example, a fresh and cooling air system with which the hot exhaust gas flowing along the train surface can be cooled and the train compartments can be ventilated. The particular advantage of aero-derivatives can be found in their compact and lightweight construction, their very high thermal efficiency (usually over 40%) and their very quick replacement (less than 24 hours). The mobile use of an aero-derivative for power generation upstream of, in particular, a high-speed train at cruising speeds of 200 km/h to about 1000 km/h has several advantages:

1. At high cruising speeds, no airflow suction work has to be performed by the aero-derivative, requiring less compaction work to produce the same combustor entry pressure as compared to aero derivative stationary gas turbine. Overall, this increases the thermal efficiency of aero derivative.

2. In addition, the aero derivative positioned upstream of the high-speed train produces a significant reduction in aerodynamic resistance, since only a reduced or no back pressure area can form in the area of the air intake. The RB211 has, for example, an inlet diameter of about 2.1 m.

3. The exhaust of the aero derivative, which escaped at about 20 m/s-30 m/s, can flow along or can be also guided along the train surface, in order to reduce friction losses through a kind of air buffer between the stationary air (environment) and the fast-moving train. In particular, a targeted blowing out of the exhaust gas is advantageous in the rear region of the train (train end), because thereby the suction effect and thus the aerodynamic airstream resistance is reduced, especially at high cruising speeds. If the exhaust pressure for a minimum blow-off speed due to e.g. friction within the pipeline should not be sufficient, partially relaxed exhaust (higher pressure) could be removed from a turbine stage.

At typical travel speeds for high speed trains (greater than 250 km/h), the aerodynamic resistance is 75% of the total travel resistance. This aerodynamic resistance again accounts for 50% of the frictional resistance and 50% of the pressure resistance.

In a preferred embodiment of the invention, the vehicle is a truck, a passenger car, a flying object and/or a train. Advantageously, the turbine system of the present invention can be applied to fuel economy of a variety of vehicles. The preferred mentioned vehicles are particularly suitable because they generate, in the prior art, increased air resistance due to their operating speeds. Therefore, it can come for the mentioned vehicles with standard vehicle fronts to a particularly high reduction of the back pressure due to the turbine. Furthermore, under customary use of said vehicles, a particularly high proportion of usable energy can be obtained from the airstream, so that the turbine system for these vehicles leads to a particularly effective fuel saving. In a particularly preferred embodiment of the invention, the truck is a CBE (cab behind engine truck), which is also preferably referred to as Langhauber truck in German-speaking countries. CBE trucks are used in particular in the US or in Australia. When using CBE trucks, the front of the vehicle is characterized by an engine compartment upstream of the cab, the turbine system according to the invention leads to a surprisingly effective reduction of the airflow and thus to the saving of fuel. In addition, further particularly preferred trucks within the meaning of the invention are COEs (cab over engine truck). In these models, the engine is located below the cab, which achieves a flat front of the vehicle and reduces the overall length of the vehicle. COE trucks are used in particular in Europe as well as in Asia, for example in Japan or China. Since the fuel economy of both CBEs and COE trucks is particularly high through the use of the turbine system, and these types of trucks are used globally, this preferred embodiment has particularly high commercial relevance too.

In a preferred embodiment of the invention, the turbine system is characterized in that the windshield is mounted at the upper end by means of a linkage to a roll bar attached to the vehicle housing and the windshield is secured at the lower end by means of a support plate to the chassis of the vehicle. The preferred turbine mount is particularly suitable for attaching the wind turbine to a truck, but can also be used for example for vans or cars preferred. The windshield is preferably adapted to the dimensioning of the wind turbine and preferably surrounds the rotor blades of the wind turbine as housing. The windshield is therefore preferably referred to as a nacelle, wind turbine ring housing or annular housing. The windshield may preferably be attached via struts to the hub of the wind turbine, so that the rotor blades are rotatable mounted in the windshield. The upper and lower ends of the windshield are preferably defined along the axis marked by gravity. A linkage, configured for example as aerodynamic profile, connects preferably the upper end of the windshield and the roll bar. It is particularly preferred that the linkage comprises two struts, which are each fixed laterally to the maximum circumference of the windshield. The roll bar is preferably attached to the chassis. In the case of a truck is the roll bar preferably a linkage, which is vertically mounted behind the cab and thus forms the roll bar. Such an upper attachment of the windshield has proved to be particularly stable. In particular, the inherent flexibility of the windshield mounting on the linkage and on the roll bar compensates vehicle vibration and thus avoids the occurrence of fractures. It is also particularly preferred that the windshield is fastened to the chassis of the vehicle at a lower end with the aid of a carrier plate. This additionally supports the attachment of the wind turbine, wherein it may be preferred to interpose a spring-damper system between the carrier plate and the chassis. This also can attenuate occurring vehicle vibrations. Preferably, the windshield is made of hard, lightweight materials such as composites. As a result, the weight of the turbine mount can be reduced without reducing the stability. Furthermore, it is preferred that the outer diameter of the windshield increases to the vehicle-facing side. As a result, the incident airflow can be deflected almost lossless, creating a particularly advantageous aerodynamic behavior of the windshield during the drive. In addition, this leads to a widening of the flow area in front of the vehicle front, causing an additional reduction of the back pressure by the wind turbine. At this particularly preferred turbine mount, a particularly pronounced fuel saving is possible in addition to a particularly stable mounting.

It is thus particularly preferred that the windshield is attached to the vehicle front and/or to the hub of the turbine in order to allow a stable fixation.

In a further embodiment of the invention, a turbine system comprising rotor blades can also be characterized in that the windshield is attached to the outer ends of the rotor blades, so that the windshield rotates with the rotor blades. In this embodiment, the windshield is thus not fixed to the vehicle front and/or for example to the hub of the turbine stationary, but rotates with the rotor blades. This application can be particularly advantageous if the windshield is to stabilize the rotor blade tips like a shroud.

In a preferred embodiment, the invention further relates to a vehicle with a turbine system according to the invention or preferred embodiments thereof, wherein the turbine is mounted by means of the turbine mount on the front of the vehicle and/or on a chassis in front of the vehicle front.

The skilled person realizes that the advantages of the turbine system according to the invention and preferred embodiments thereof also apply to the vehicle on which the turbine system is present.

DETAILED DESCRIPTION

For the purposes of the invention, it may be preferred that the turbine system or preferred embodiments thereof and/or the use of the turbine system or preferred embodiments thereof for saving fuel in a vehicle also referred to as (TuWing) technology. If examples of vehicles equipped with a (TuWing) technology are given than vehicles are meant preferably with attached turbine system according to the invention or preferred embodiments thereof. By contrast, the term "standard" is preferably used to refer to those vehicles which are not equipped with the (TuWing) technology and therefore do not have attached turbine systems according to the invention or preferred embodiments thereof.

In the following, the invention will be explained in more detail with reference to examples, without being limited to these.

BRIEF DESCRIPTION OF THE PICTURES

Figure 2:
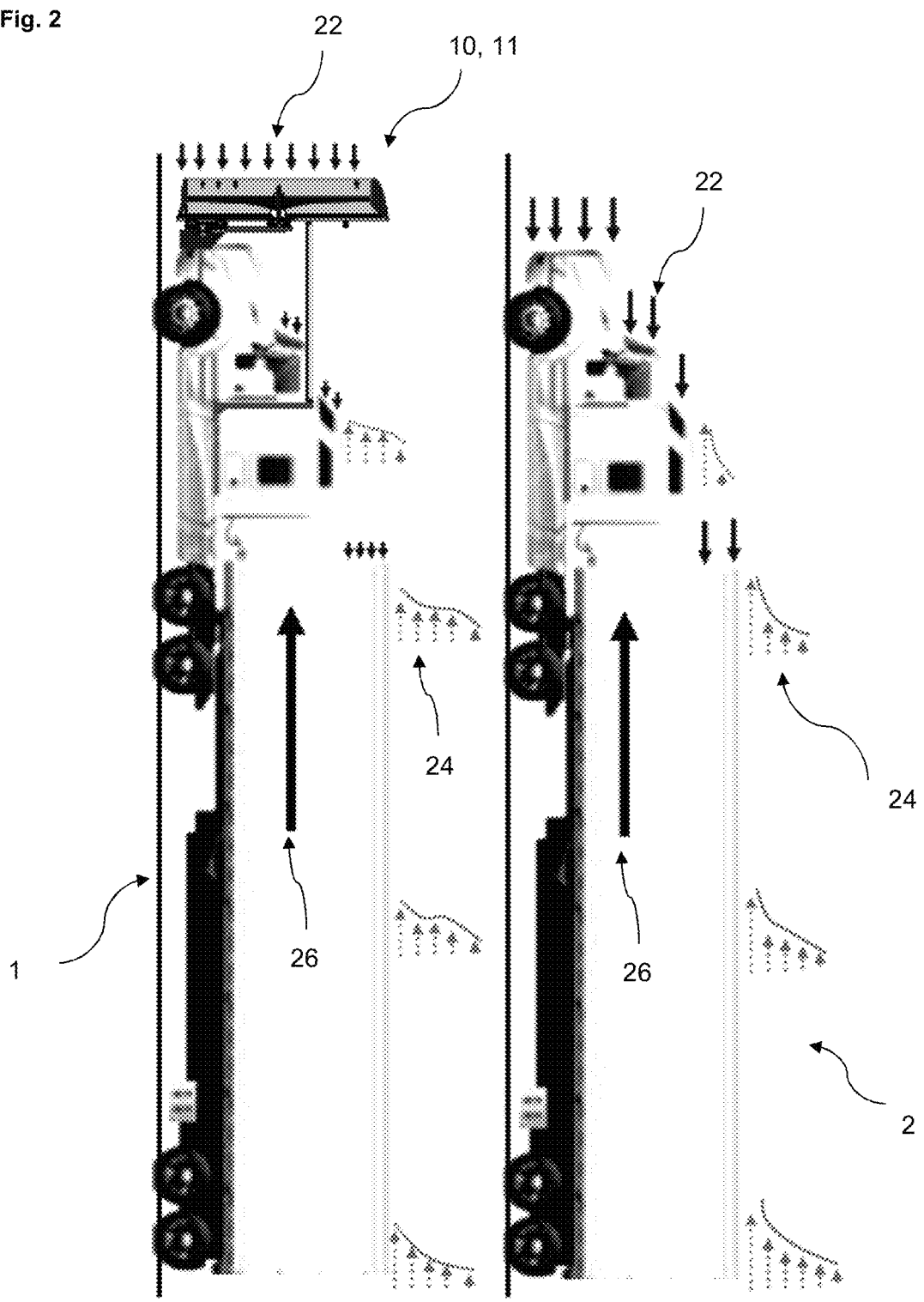
Figure 3:
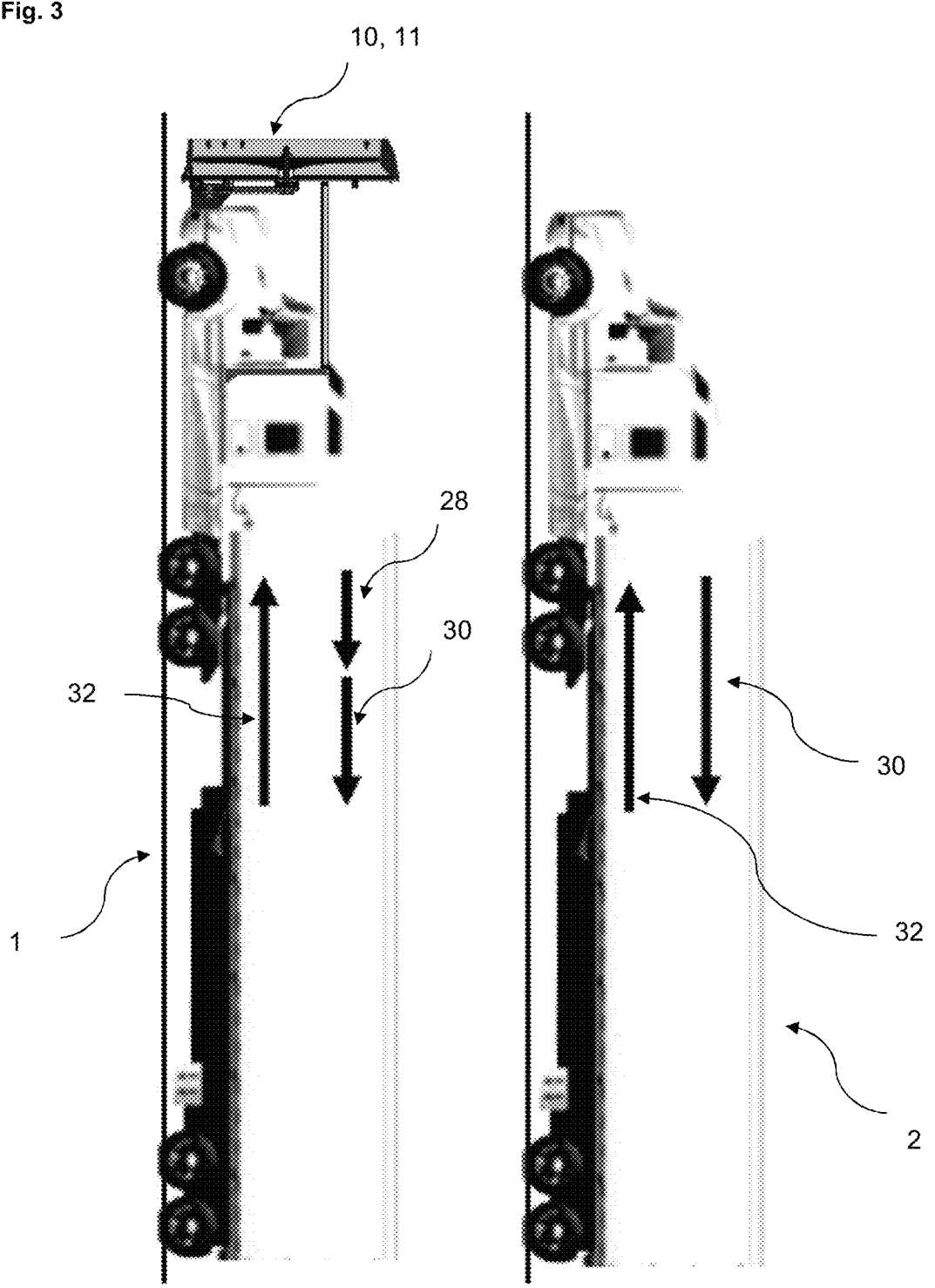
Figure 4:
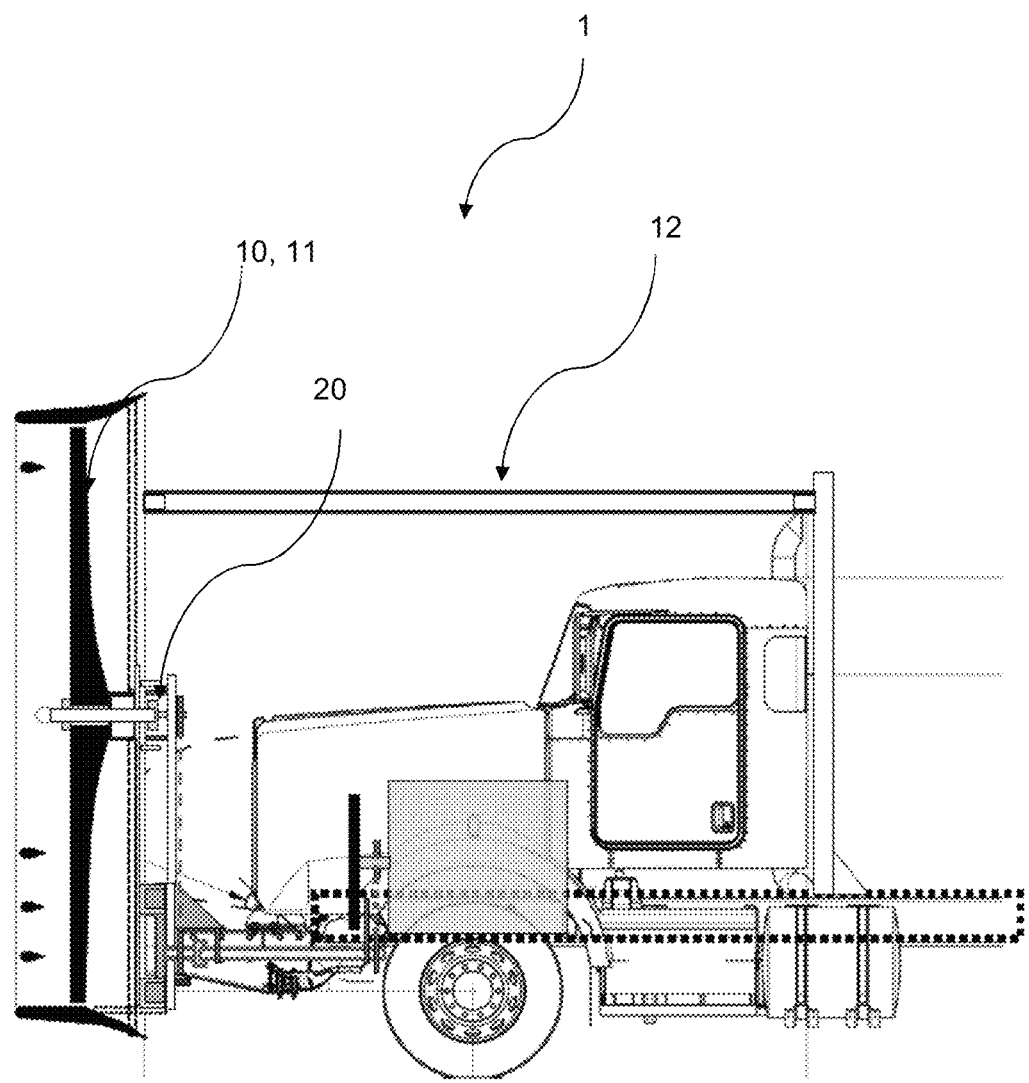
Figure 5:
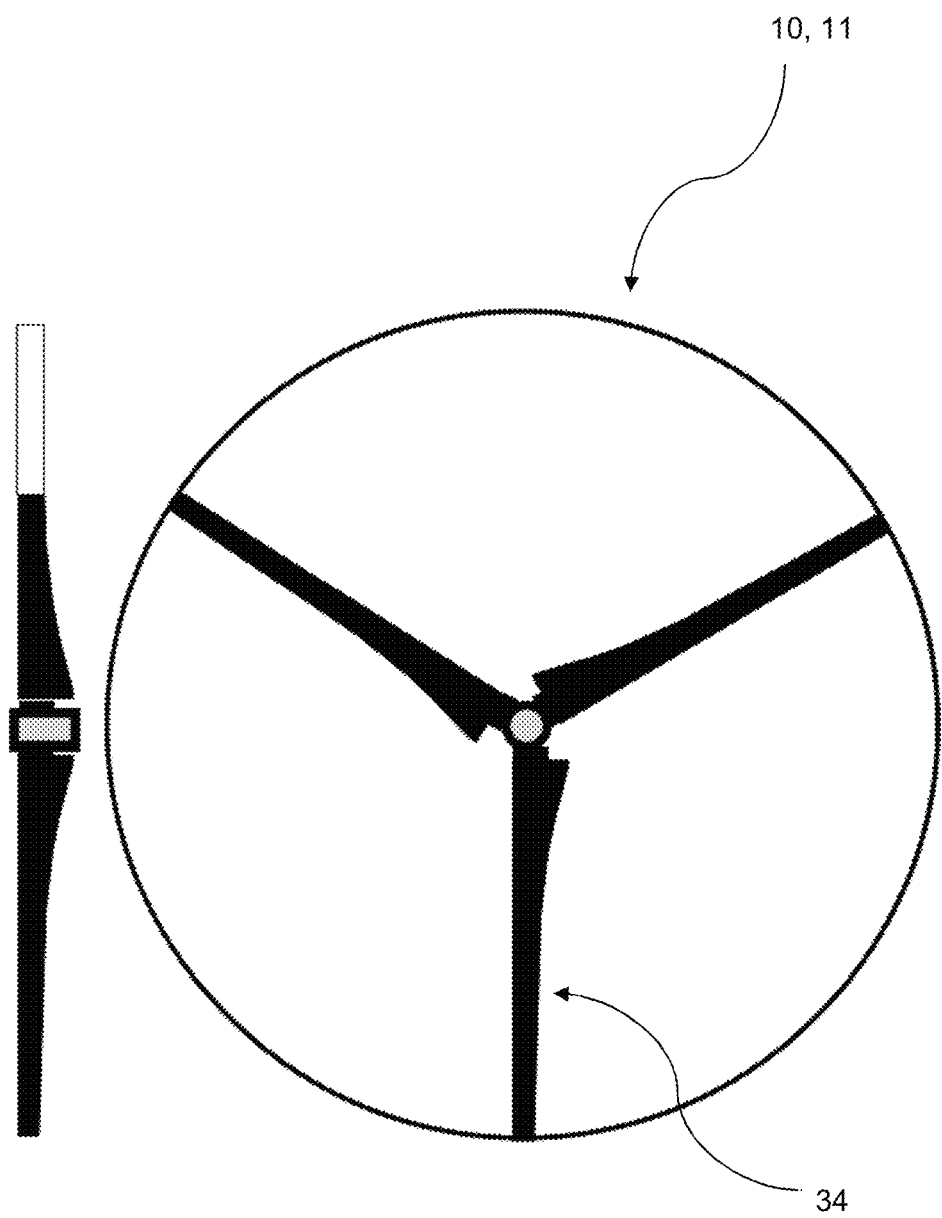
Figure 6:
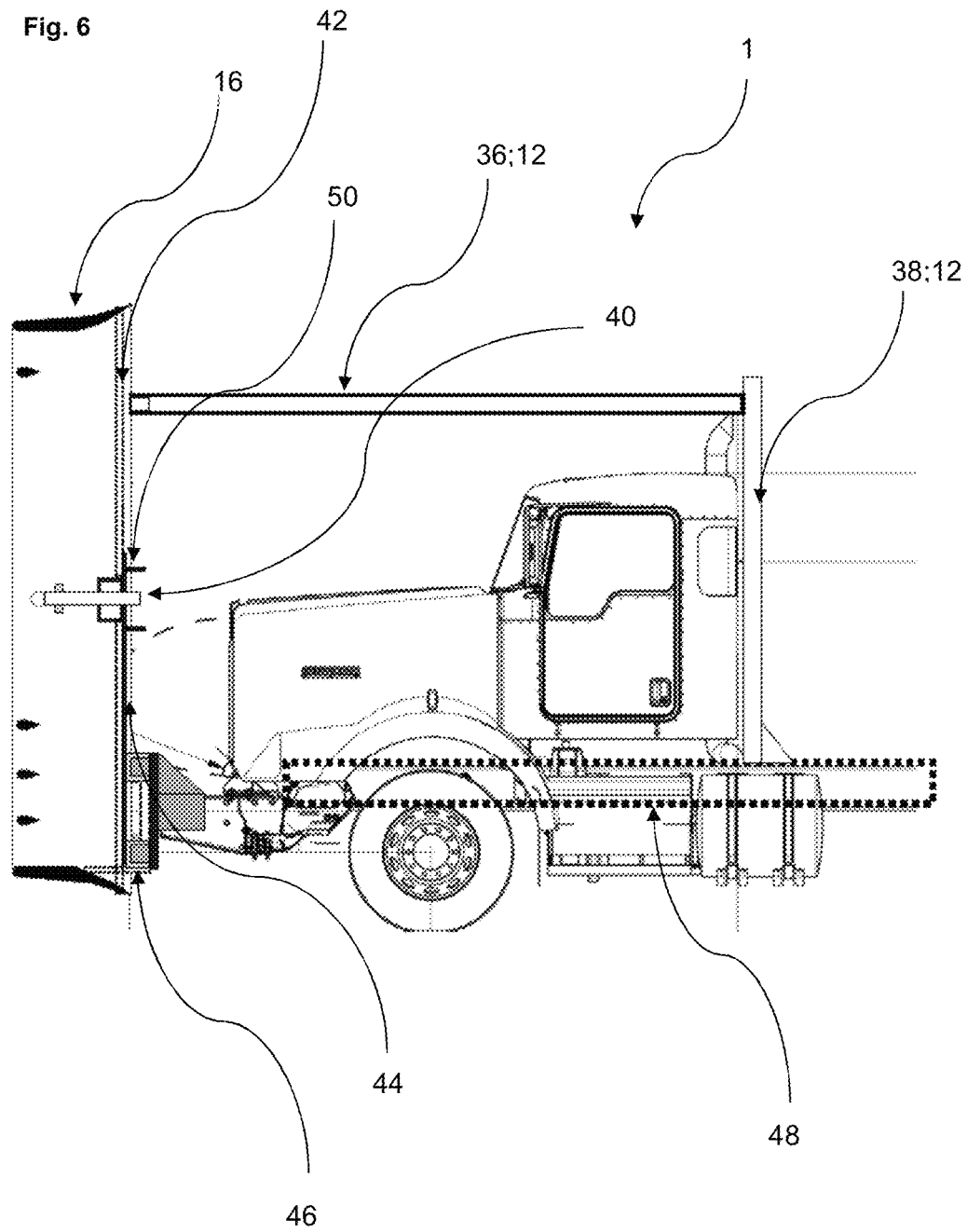
Figure 7:
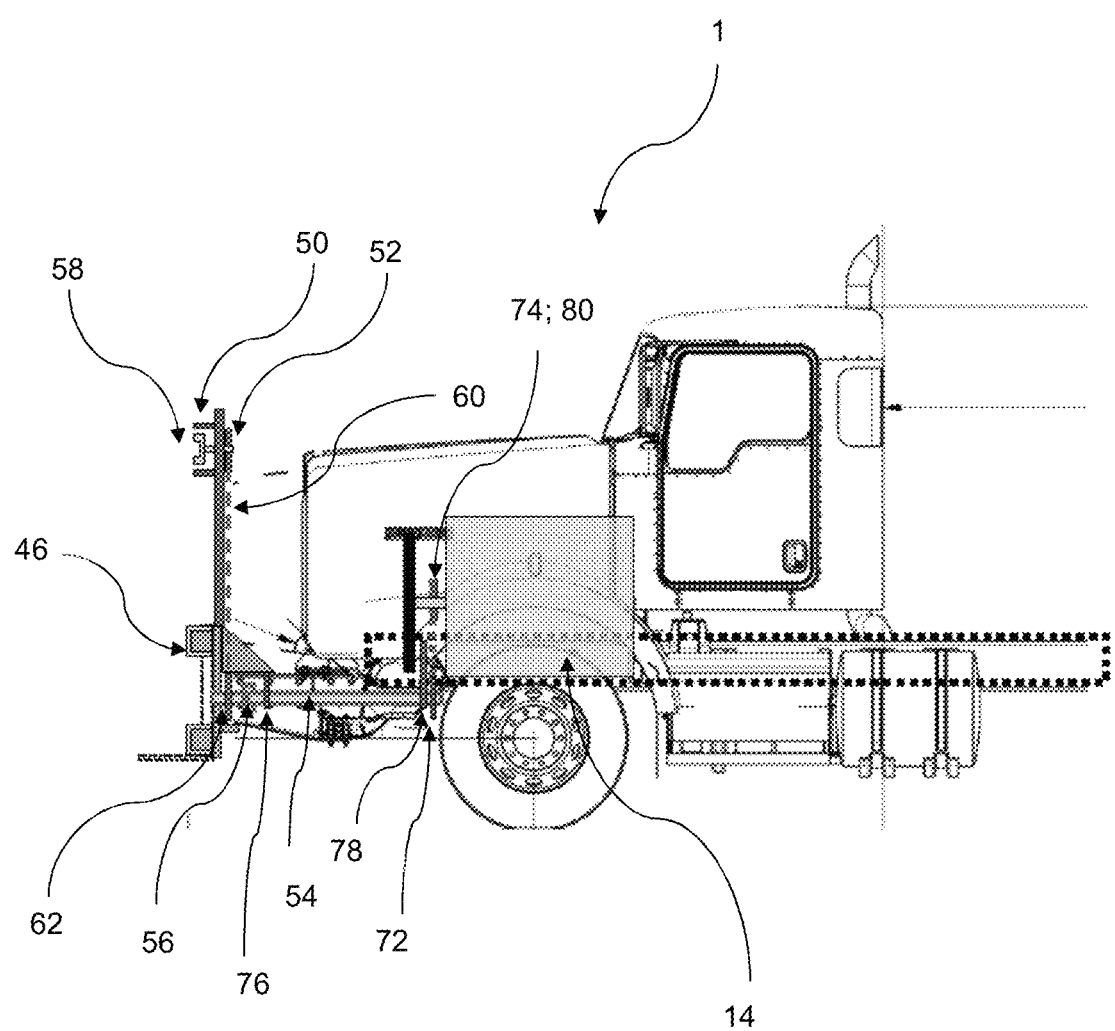
Figure 8:
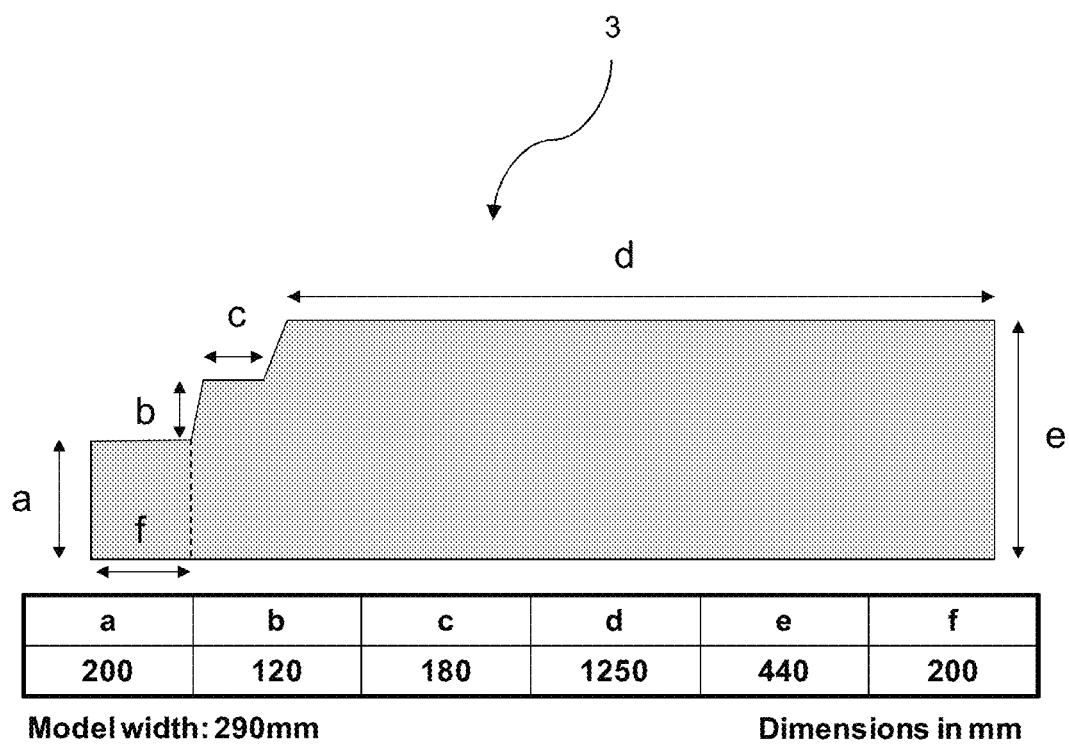
Figure 9:
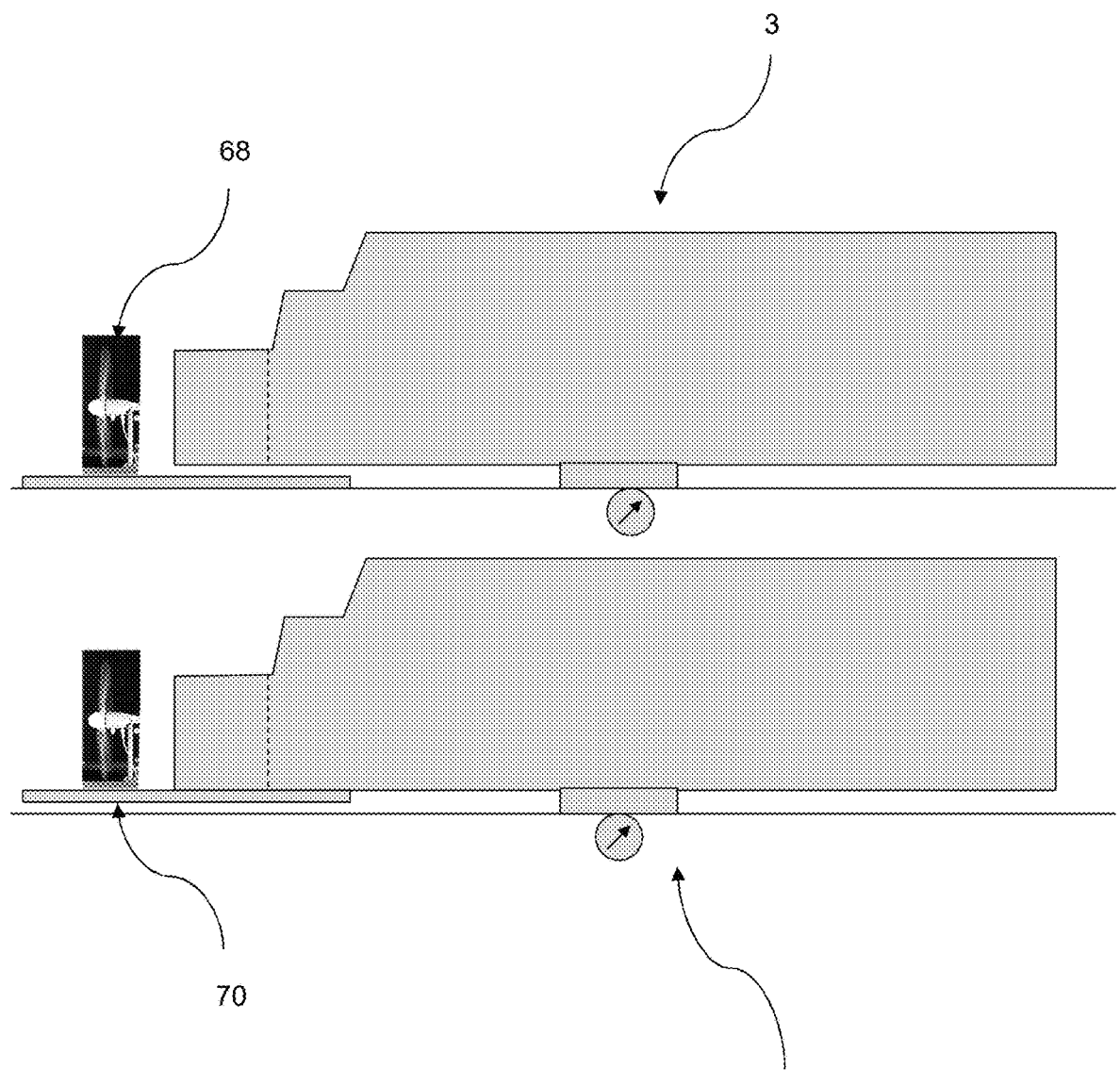
Figure 10:
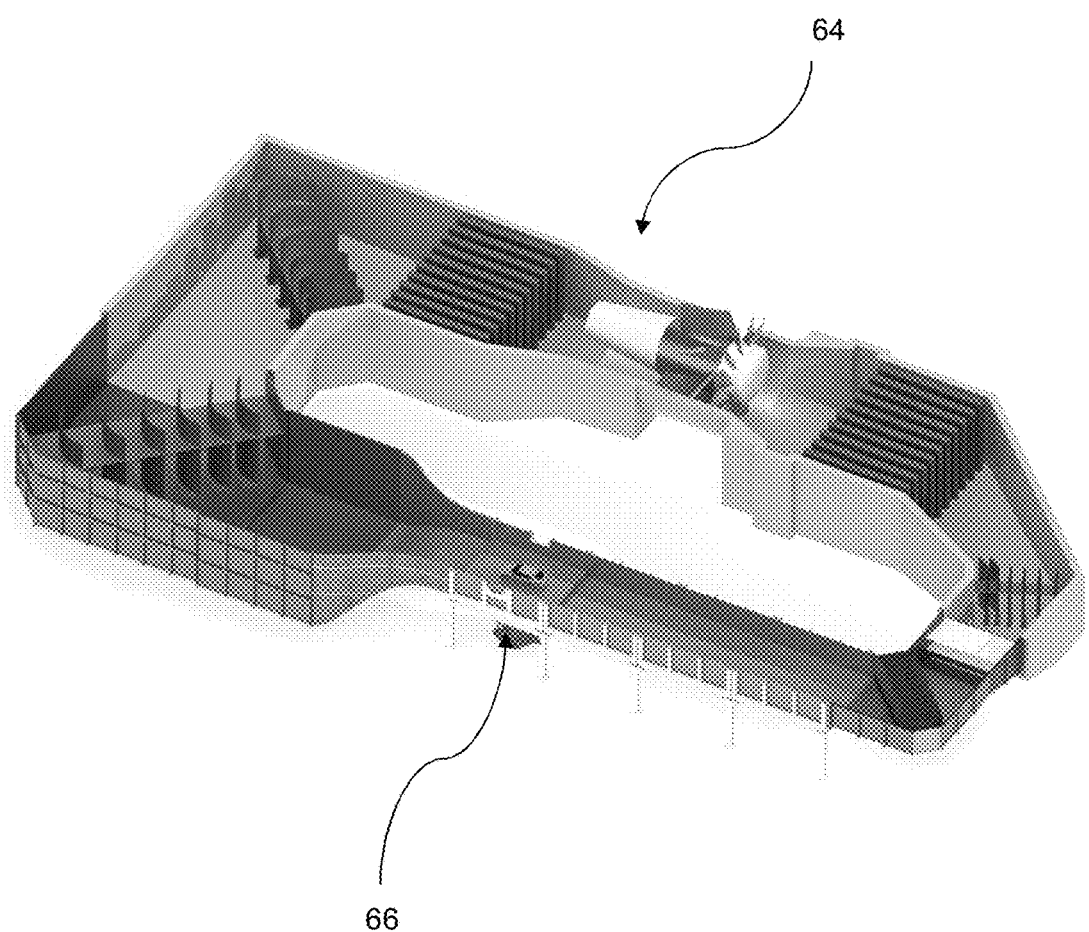
Figure 11:
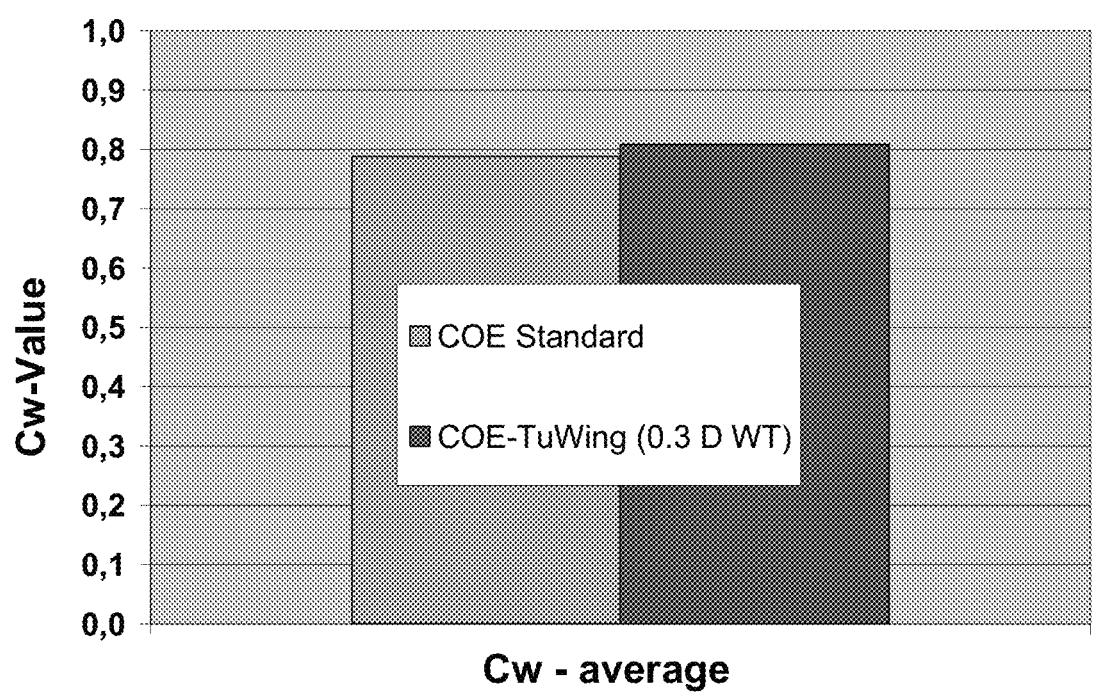
Figure 12:
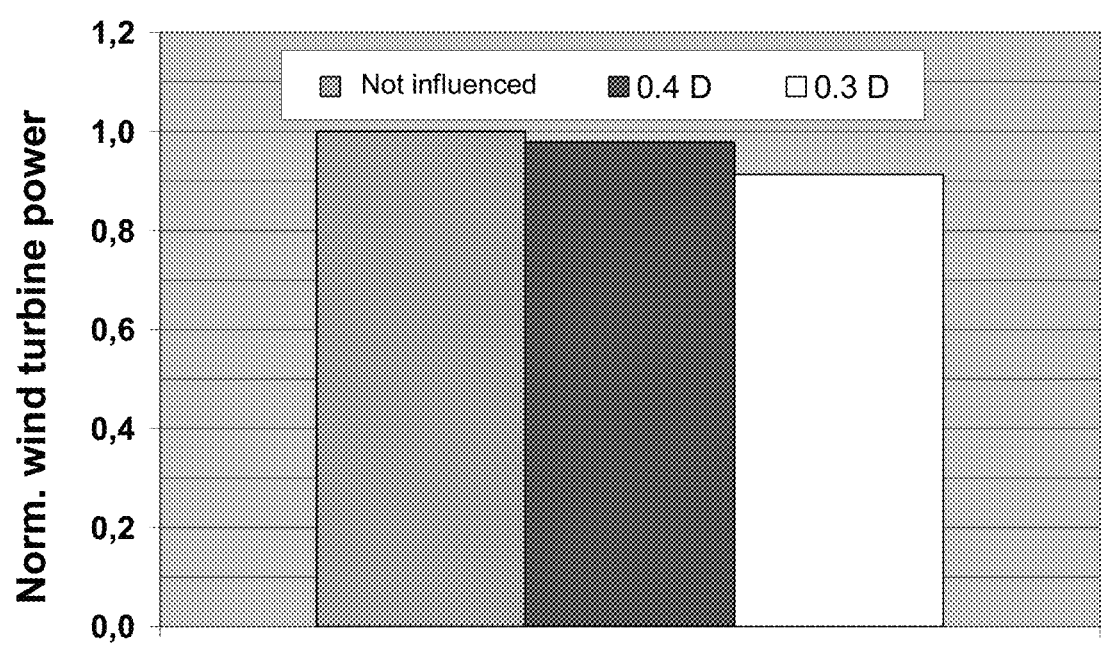
Figure 13:
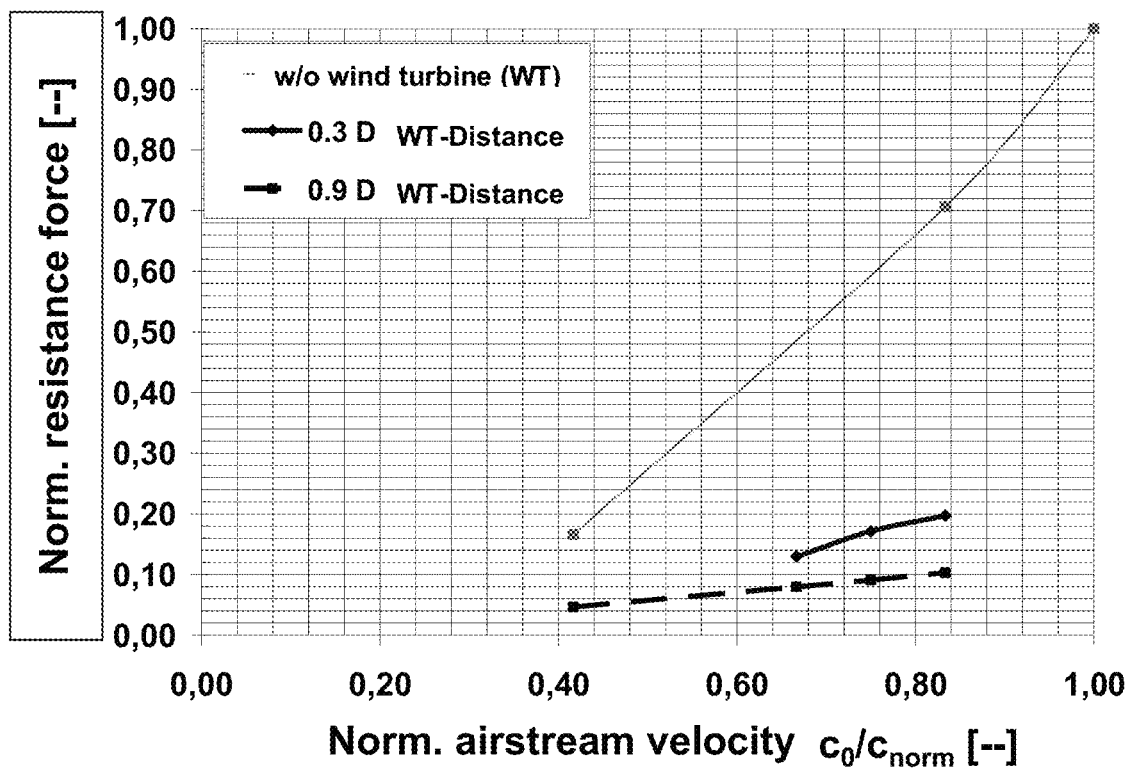
Figure 14:
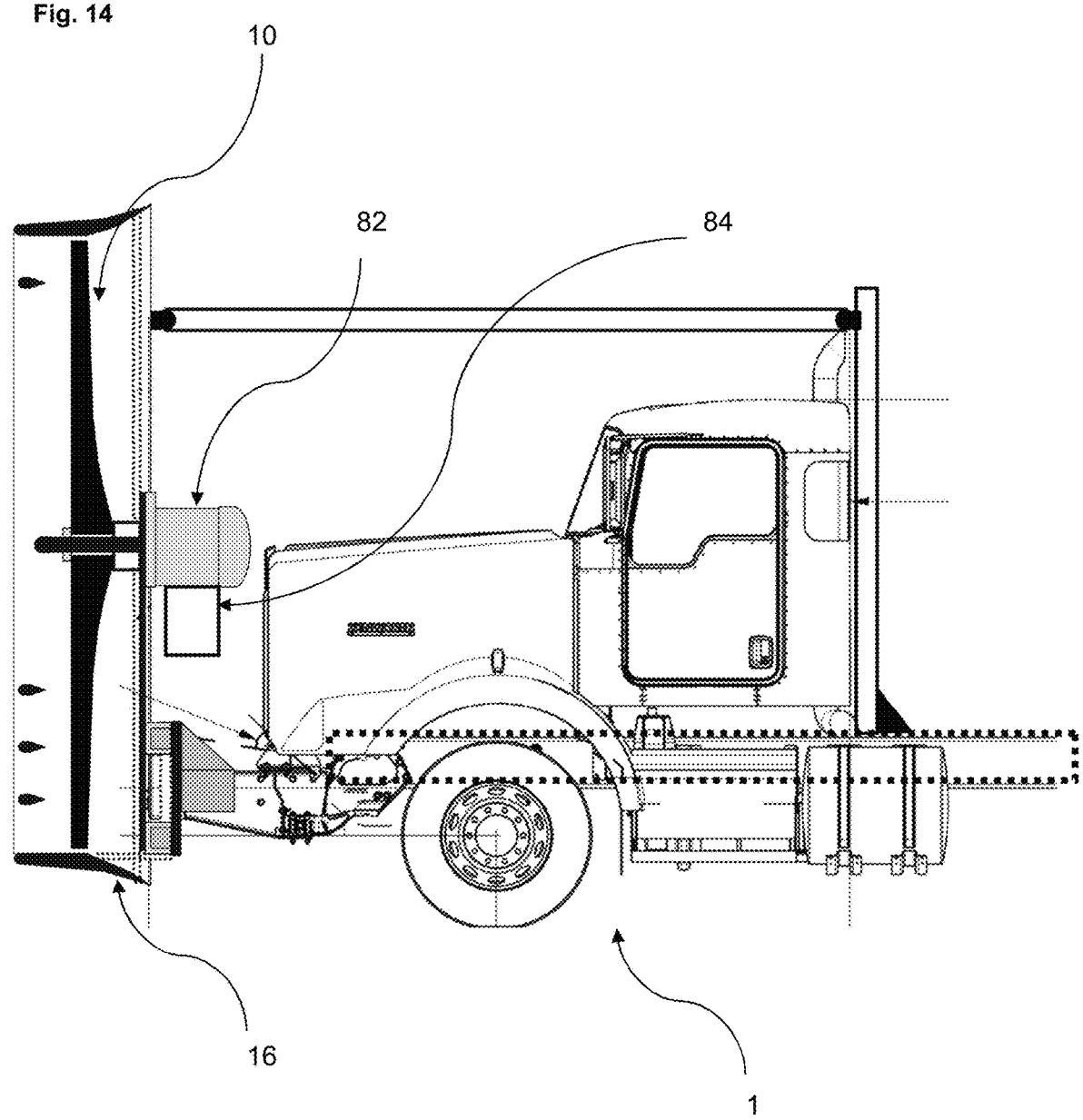

FIG. 1 Schematic representation of a preferred embodiment of the invention, which shows the use of the turbine system on a truck FIG. 2 Schematic representation of the application and effect of reducing the back pressure on the example of a CBE truck with and without turbine system FIG. 3 Schematic representation of a comparison of the axially acting forces on a truck with and without a turbine system FIG. 4 Schematic representation of preferred components of the turbine system using the example of a CBE truck FIG. 5 Schematic representation of a preferred wind turbine with shroud for a CBE truck FIG. 6 Schematic representation of preferred components of the turbine mount FIG. 7 Schematic representation of the preferred mechanical coupling of the wind turbine to an engine of a CBE truck FIG. 8 Schematic representation of a truck model for the implementation of the test in the wind tunnel FIG. 9 Schematic representation of the measurement configurations for carrying out the test in the wind tunnel FIG. 10 Schematic representation of the wind tunnel with measuring section FIG. 11 Experimental results for the determination of the $c_w$-value of the model truck with and without a turbine system FIG. 12 Experimental results for the normalized wind turbine power as a function of the distance of the wind turbine from the front of the vehicle FIG. 13 Experimental results for the influence of the wind turbine's slipstream on a COE standard truck as a function of the distance of the wind turbine from the vehicle front FIG. 14 Schematic representation of preferred components of the turbine system for power generation using the example of a CBE truck FIG. 15 Schematic illustration of the airflow guidance through the windshield and wind turbine for a preferred embodiment of the turbine system on the example of a CBE truck FIG. 16 Schematic illustration of the airflow guidance through windshield and gas turbine for a preferred embodiment of the turbine system on the example of a train FIG. 17 Experimental results for the composition of the wind resistance of a truck with and without a wind turbine

DETAILED DESCRIPTION OF PREFERRED EMBODIMENTS OF THE INVENTION

A schematic structure of a CBE truck with attached turbine system is shown in FIG. 1 from which can be derived how the 1st principle can be e.g. technically (very simplified) realized at forward speeds of 80 km/h to 140 km/h. A CBE (cab behind engine truck) is preferably a Langhauber truck with the engine in front of the cab. The embodiments show how the above-mentioned first principle can preferably be implemented by a turbine system in order to convert part of the kinetic energy contained in the airstream into mechanical energy. It will be apparent to those skilled in the art how this technical implementation is transferable to other vehicles. The main components of the turbine system consist in this example of a wind turbine, its mounting frame, a clutch and its connection to the truck drive train.

At higher forward speeds from 140 km/h to 1000 km/h (e.g., high speed trains), the conversion of the kinetic energy contained in the airstream into mechanical energy is much more complex and cannot be longer realized e.g. by a simple wind turbine. In order to be able to simultaneously fulfill the principle 2 in the said speed range, it would be possible with today's technical means, e.g. use a mobile gas turbine for direct power generation (aero-derivative). The inlet diameter of the gas turbine (in the area of the air intake) would, however, preferably be chosen so large that, as in the example of the CBE truck with mounted wind turbine, the cross-sectional area of windshield and turbine covers at least 60%, preferably at least 80% and particularly preferably at least 90% of frontal projection area of the vehicle. Gas turbines of this size typically produce power in excess of the required power from current high-speed trains (e.g., 5 MW-8 MW), and would be particularly worthwhile feeding the excess power into the general grid.

In FIG. 2 is shown the effect on the flow pressure and on the boundary layer development using the example of a CBE truck with and without installed turbine system which explains schematically the above-mentioned principle 2. Here, it is assumed that the truck moves with 90 km/h through resting (stationary) air. The front of the vehicle thus continuously encounters a static air mass, which is initially compressed and then partially carried along by the vehicle in the further course. In the case of the standard truck, the stationary air mass hits the 90 km/h vehicle front, resulting in accumulation and is shown in the upper image of FIG. 2 by filled arrows against the vehicle direction. In the further course, especially along the semi-trailer (also 90 km/h fast), the flow is entrained directly on the surface, which adjust the flow velocities shown by dotted arrows (greatly enlarged illustrated). In the case of the truck with a turbine system, the stationary air mass initially strikes the rotating wind turbine blades, where it also comes to an accumulation, but which is much smaller than at the standard truck. This is mainly because the stationary air mass can flow through the wind turbine and does not have to flow around the vehicle front. When flowing through the wind turbine, the air mass is also entrained in the direction of travel and achieves further downstream speeds that are in the order of the forward speed (about 50%-60% of 90 km/h). This significantly reduces the accumulation effect close to the vehicle front and the flow closely along the semi-trailer is now less entrained and causes less flow losses, because they had already delivered part of their kinetic energy to the wind turbine. This process is visualized in the lower image of FIG. 2 by smaller flow velocities (shorter arrows, illustrated greatly enlarged). The effect of the turbine system on the airflow is shown at the example of a CBE truck, but it is preferably analogous to other trucks or vehicles using the turbine system. The change of the airflow and a reduced accumulating effect in combination with the airstream energy conversion using the turbine system contribute to a reduction in fuel.

Forward speeds from 400 km/h to 1000 km/h occur e.g. on high-speed trains. At these forward speeds, the use of a wind-driven wheel as a wind turbine, which is mechanically coupled to the engine, is not very advantageous and should preferably be e.g. replaced by an axial gas turbine for power generation (Aero-derivative). As a result, the back pressure can be significantly lowered upstream of the gas turbine, for example, or completely avoided when achieving the optimal forward speed for the gas turbine. The relatively slow but hot air flowing out of the gas turbine outlet is preferably blown out at different positions of the train surface. If necessary, the hot air can also be routed via a pipe system to the rear of the train. The individual train compartments are preferably supplied with air, which is e.g. removed from the compressor of the gas turbine and feed via a pipe system to the appropriate positions.

In FIG. 3, the above-mentioned 3rd principle of the conservation of axial forces is visualized with and without an installed turbine system using the example of a CBE truck. Here, it is assumed that the truck moves with 90 km/h through stationary air on level road. In the standard truck, the generated force of the engine corresponds to the vehicle resistance force. In the case of the truck with turbine system, the total resistance is equal to that of the standard truck but is composed of the reduced resistance force and the additional axial wind turbine force.

Using the example of a standard CBE truck, a particularly simple, technical implementation of the presented principles for saving fuel will be presented and explained in more detail below.

For this purpose, preferred main components of the turbine system are shown in FIG. 4, which preferably consist of a wind turbine, a turbine mount comprising a windshield and a torque transmission unit for the engine of the vehicle.

In FIG. 14, an alternative embodiment of the turbine system is shown, which has instead of a torque-transmitting unit, a generator comprising associated power electronics for generating electricity.

The basic approach for a constructive and aerodynamic design of the wind turbine preferably does not differ from wind turbines used in conventional prior art, since the deployment parameter is very similar for generating energy from wind power. Wind turbines are designed today for wind speeds up to 45 m/s (about 160 km/h) and for already relatively high speeds. This is close to the desired operating range in which the wind turbine for the CBE truck can be particularly operated effectively. It may be necessary to use materials other than the one used for conventional wind turbines to guarantee a safe distance from the material limits during operation. Only, it is preferred to ensure in the aerodynamic design of the rotor blades of the wind turbines that their direction of rotation match with the direction of rotation of the truck engine when driving forward and the wind turbine is designed for an averaged airstream speed of about 25 m/s (about 90 km/h) and not, as usual in stationary wind turbine construction, between 10-15 m/s. The profile geometry as well as the torsion of the rotor blade varies significantly with the distance to the rotor axis and should preferably be adapted for this airstream speed of about 25 m/s. The number of rotor blades may preferably be 3. This number has proven in the wind turbine construction.

FIG. 5 shows a preferred embodiment of the wind turbine with three rotor blades. In addition, protective devices are to be included in the design, which in combination with the other main components of the turbine system, for example, prevents that the maximum speed is exceeded. For this, too, technical solutions from wind turbine construction can preferably be adapted. E.g., brake shoes with spring elements can be attached to the outside of a wind turbine shroud, which are pressed on the inner side of the windshield when exceeding a defined speed.

As shown in FIG. 6, a preferred turbine mount, which is a wind turbine mount (WTH) in this case, consists mainly of the windshield in which the wind turbine is mounted. The windshield itself is preferably fixed in the lower region on a support plate, for example on a snowflake plate, which is preferably connected via a spring-damper system to the chassis to avoid vibration excitation of the components. In the upper area, the trailing edge of the windshield is preferably supported, for example, at two different circumferential positions by a linkage, which introduces the absorbed axial forces via a roll bar positioned on the rear side of the cab into the chassis. Additional forces acting on the windshield are preferably transmitted via several struts, which are arranged in the region of the exit edge of the windshield at different circumferential positions, to the rotor axis and introduced from there via a metal frame and support into the chassis. The windshield is preferably made largely of very lightweight material such as composite material. Aerodynamically optimized cross struts (cow catcher) can be installed in the lower part of the front of the windshield to avoid damage by, for example, wild; if necessary, stiffening can also be made. The outside and inside of the windshield should preferably grow in diameter in the opposite direction of travel, as indicated in FIG. 6. The outer diameter of the windshield does not necessarily have to be uniform along the circumference. As a result, the airstream flowing at the outside of the windshield is preferably deflected aerodynamically without loss and supports the expansion of the flow region with low speed downstream of the wind turbine.

As shown exemplary in FIG. 7, the generated torque can be passed through the wind turbine via a centrifugal clutch to a gear 1 with freewheel. The centrifugal clutch is preferably installed for safety reasons and can prevent in combination with a free-wheel that a stationary or very slowly rotating wind turbine is driven by the truck engine. The built-in freewheel on the gear 1 preferably ensures that a speed increase (for example during acceleration) on the motor side cannot be transmitted to the wind turbine. The free-wheel also prevents the unlikely event that torques are transmitted to the engine when the wind turbine rotates in opposite direction. The torque is further preferably transmitted from gear 1 to gear 2, for example by means of a chain 1. The forwarding of the torque to the motor preferably takes place via a further centrifugal clutch 2 and via a shaft, which are fastened to the carrier plate and to the bearing 1. The centrifugal clutch, on the one hand, ensures that torque is only transmitted to the engine when the engine is rotating at a minimum speed acceptable to the wind turbine. On the other hand, it can be particularly well ensured that no torque is transmitted from the engine to the wind turbine when the engine speed suddenly drops sharply. The bearing 2 is preferably mounted on the chassis. The torque is then introduced via gear 3 and a chain 2 into the gear 4, which is screwed tightly between the fan and motor.

The preferred embodiments of the turbine system have a number of technical advantages compared to the prior art:
- Simple design with few individual components, which nevertheless ensures fuel savings of at least 30%
- The turbine system can be used largely independent of the vehicle
- Many (Tuwing) items are already used in similar ways in other applications. This allows the use of state of the art technology.

Low maintenance costs due to a robust construction

Applicability of the turbine system for COE and CBE trucks, especially with a $c_w$ value greater than 0.4

Quick to install and disassemble the turbine system when using special tools (Plug & Drive)

Significant fuel savings regardless of the type of truck trailer; in preferred embodiments of the turbine system, no additional changes to the trailer itself are necessary.

Furthermore, the individuality of each truck is advantageously preserved and "embellishments" on the truck tractor do not lead to greater flow resistance. In the prior art, the aerodynamic optimization of a truck towards the smallest possible drag coefficient $c_w$ inevitably leads to very similar-looking trucks among the truck manufacturers. As a result, customization of trucks according customer requirements is not possible. In addition, the Plug & Drive technology enables rapid installation and disassembling of the turbine system so that, for example, forwarding companies/truckers can decide for themselves when fuel shall be saved.

A very particular advantage of the turbine system according to the invention and preferred embodiments thereof is the reduction of the fuel which is necessary to drive the vehicle. In the following, the fuel saving for a wind turbine is described, which is mounted in front of a truck and is driven only by the airstream. It is particularly preferred that the common cross-sectional area of the wind turbine and the windshield is at least 60%, preferably at least 80% and particularly preferably at least 90% of the frontal projection area of the truck and is fastened to it frontally. For other vehicles, the cross-sectional area of the wind turbine and the windshield would preferably be adjusted in an analogous manner to also achieve the preferred fuel economy.

Part of the kinetic energy contained in the airstream is converted by the wind turbine in the form of rotational energy (mechanical energy), before it would be lost in technically unusable friction energy due to flow losses along the vehicle. The mechanical energy is transmitted in the form of a torque, preferably by means of a coupling to the drive train. Downstream of the wind turbine, the flow velocity of the airstream has been reduced to approximately 40%-50% of the initial velocity due to the kinetic energy removed which can be achieved by e.g. a truck with a turbine system, FIG. 7. The slowed flow velocity around the truck causes a significant resistance reduction (resistance force in the direction of airstream) according to Equ. 1. At the same time, the wind turbine generates significant axial forces (in direction of airstream) mainly due to the aerodynamic forces on the wind turbine blades and less due to resistance losses (Equ. 2, see Gasch, Robert; Windkraftanlagen, 2nd edition, B G Teubner Stuttgart, p. 156). For the purposes of the invention, these forces are also preferably referred to as aerodynamic axial forces of the turbine. The turbine blades can preferably be aerodynamically optimized such that resistance losses hardly occur and high blade tip losses can be largely avoided by a shroud mounted on the blades.

$$F_W = c_w \cdot A_{front} \cdot \frac{\rho_{air}}{2} c_1^2 \qquad \text{Equ. 1}$$

$F_W$ – air drag force [N]; $c_w$ – drag coefficient;

$A_{front}$ – Truck front area;

$c_1$ – flow speed downstream of the windturbine $F_W$—air drag force [N]; $c_w$—drag coefficient; $A_{front}$—Truck front area;

$c_1$—flow speed downstream of the windturbine $$F_S = F_{ST} \cdot c_s(\lambda); \; F_{St} = \frac{\rho_{air}}{2} \cdot \pi \cdot R^2 \cdot c_0 \qquad \text{Equ. 2}$$

$F_s$ – axial force windturbine [N];

$c_s$ – Thrust coefficient; $R$ – Radius windturbine;

$c_0$ – flow speed in front of windturbine;

$\rho_{air}$ – density air $F_s$—axial force windturbine [N]; $c_s$—Thrust coefficient; $R$—Radius windturbine; $c_0$—flow speed in front of windturbine; $\rho_{air}$—density air For these reasons, the wind turbine is preferably designed so that the additionally generated axial aerodynamic forces of the wind turbine are compensated precisely by the saved axial resistance forces of the truck. While the balance of forces in the axial direction (in the direction of airstream) of a truck with and without a turbine system is identical, the truck engine of the truck with turbine system is advantageously relieved by the available mechanical energy from the wind turbine. The performance of the wind turbine can be estimated conservatively using Equ. 3 (see Gasch, Robert; Windkraftanlagen, 2nd edition, B. G., Teubner Stuttgart, p. 156).

$$P = c_0 \cdot F_{ST} \cdot c_p(\lambda) \qquad \text{Equ. 3}$$

P—Windturbine Power [W]; $F_{ST}$—Reference force [N]; $c_p$—Power coefficient;

$c_0$—flow speed in front of windturbine

The extracted wind energy from the airstream leads, as already mentioned, to a reduced flow velocity downstream of the wind turbine, which also remains further downstream. If the experimental results from the wind turbine construction are transferred to the CBE truck with turbine system, then a wind turbine average flow rate of 40% and 50% of the original air speed (upstream from the wind turbine) would still be expected at 1 and 6 wind turbine diameter downstream of the truck (see Gasch, Robert, Twele, Jochen, Wind turbines, 7th edition, Vieweg Teubner, p. 155).

Depending on the drag coefficient $c_w$ (indicator of a good or bad aerodynamic surface) of a vehicle and preferably of a respective truck/semitrailer, the fuel cost savings potential can be between € 8 k and € 17 k per year if the truck/semitrailer has a mileage of more than 105,000 km per year (see calculation based on constraints of Table 1).

To calculate the 30% fuel economy in the preferred embodiment of a CBE truck with turbine system, first the minimum measured fuel consumption and the minimum measured engine power of a standard truck were determined for different boundary conditions, which are summarized in Tab. 2. In a standard truck with a maximum total weight of 42 t and a constant travel speed of 25 m/s (57 mph) results in a minimum engine power of 90 kW and a minimum consumption of 20 l of diesel. These values are used for further calculations.

In order to be able to conclude on the fuel saving of 7.6 l diesel (see Tab. 2, 42 t Truck @ 57 mph) in the CBE truck with turbine system, the wind turbine power of 34 kW (see also Tab. 2, same line) have to be estimated using empirical formula[1,2].

[1] Gasch, Robert; Windkraftanlagen; 2nd edition, B. G. Teubner Stuttgart, p. 157

[2] Gasch, Robert, Twele, Jochen, Windkraftanlagen, 7th edition, Vieweg Teubner, p. 155

The wind turbine power can be determined with equation 3. The value 25 m/s (57 mph) is used for the airstream speed $c_0$. The required parameter $c_p$=0.52 is taken from a diagram[1,2] for a high-speed number of 7. The high-speed number describes the ratio of peripheral speed e.g. at the blade tip to the airstream speed. The missing reference force $F_{St}$ can be calculated with equation 4, whereby air density, wind turbine radius can be taken from Tab. 1 and the airstream speed is already known.

$$F_{ST} = \frac{\rho}{2} \cdot \pi \cdot R^2 \cdot c_0^2 \qquad \text{Equ. 4}$$

Put the numbers in equ. 4, then the result is 2650 N, which in Equ. 3 with the other known parameters used results in a wind turbine power of about 34 kW.

The fuel savings of 7.6 l of diesel is the outcome when simply the 34 kW wind turbine power is set in relation to the minimum engine power of 90 kW (see Tab. 2) and multiplied by the minimum fuel consumption: 7.6 l=34 kW/90 kW*20 l. The fuel saving is thus at least 30%.

The calculation of the air drag force $F_w$ with equation 1 leads to a value of 2952 N for the standard CBE truck with an assumed $c_w$ value of 0.7, with $c_0$=$c_1$=25 m/s and the already known parameters from equation 2. If you now perform the same calculation with an airstream speed of 10.5 m/s, which roughly corresponds to the speed that would available between wind turbine and CBE truck at a truck speed of 25 m/s, then you get 520 N. Now you have to add to the additional axial force of the wind turbine, which must be taken into account in the CBE truck with turbine system. The axial force of 2385 N is calculated from the already calculated reference force $F_{St}$ and a thrust coefficient $c_s$=0.9, which can be taken from a diagram[1,2] for a high-speed number of 7. This results in a total force in the axial direction of 2905 N, which corresponds approximately to the value of the standard truck. Further comparisons between the axial forces with and without a turbine system are shown in Table 1.

Experimental Test in the Wind Tunnel

To confirm the principle of operation of the turbine system, various types of semi-trailers CBE- and COE with trailer in model scale 1:9 are measured experimentally in a wind tunnel. The exact dimensions of the truck model with and without hood are shown in FIG. 8. FIG. 9 shows a schematic representation of the truck model, wherein a model wind turbine is attached to the wind tunnel floor in the upper representation and a model wind turbine is attached to the truck model in the lower representation. A three-bladed rotor with lift profile and a diameter of about 350 mm from the company Horizon (FCJJ-39) is used for the model wind turbine, which has a preferred maximum diameter based on the truck model. The ratio of blade losses to the aerodynamically generated forces is much larger on a model scale than at real operation of the wind turbine on a truck. This explains the maximum calculated tip speed ratio of 2.4 (at the blade tip) in experimental pre-tests. On the one hand, this is due to the aerodynamically poorer blade profile and the much larger vortex and blade tip losses of the model turbine. As a result, the proportion of resistance force from the wind turbine model to the overall resistance of wind turbine and truck increases. In order to preserve the similarity between wind turbine and truck losses and thus allow for the transferability of the model test results to reality in terms of relative resistance forces, the model truck has a greater $c_w$ value than today's trucks in reality. Therefore, the front of the model truck is edgier than it is for real trucks. For the CBE truck model, a $c_w$=0.81; for the COE truck a $c_w$=0.79 was determined.

FIG. 10 shows the wind tunnel in which the experimental test was performed. The measuring cabin has dimensions of 2 m×1.41 m. The measurement was carried out in the measuring section MB1. In the figure, the measuring section MB1 is shown by the positioning of a model car. There is a 6-component scale in the bottom of the measuring section. In addition, the measuring section MB1 is equipped with a false ceiling, on the one hand to ensure an undisturbed flow (without boundary layer) to the truck and on the other hand to take into account underbody effects of the truck during the measurement. The truck model is positioned about 20 mm from the ground with the help of a support and is connected directly to the measuring scale. The wind turbine is mounted in two variants in the wind tunnel (see Table 3). The wind speed is measured with two Prandtl pipes with an accuracy of +/−0.05 m/s. These are located upstream and downstream from the truck model at a distance of about 100 mm and from the ceiling wall at a distance of about 200 mm. The distance between the wind turbine and the front of the truck can be varied axially (in the direction of flow) between 0.3 D and 0.9 D. D represents the diameter of the model wind turbine. Several axial positions are selected for this test: 0.3 D, 0.4 D, 0.7 D, 0.9 D. The wind turbine is positioned in the center of the front of the truck. The model wind turbine is equipped in the hub area with a small generator that can generate electricity. The voltage is measured using a multimeter at a constant electrical resistance of 50 ohms.

The speed of the wind turbine is determined during the test by means of voltage frequency data of the wind turbine motor, which can be read directly on the oscilloscope. In order to obtain the conversion factor from the voltage frequency to the wind turbine speed, the value was visually determined before the test by means of a frequency-dependent stroboscope at low speeds (2 Hz).

Local speeds on the truck can be approximated with an impeller anemometer.

The following measuring instrumentations are used in the described experiments:

| | |
|---|---|
| Multimeter | Fluke 179 True RMS Multimeter |
| Oszilloskop | Agilent 54624A oscilloscope 100 MHz, 200 MSa/s |
| Smoke visualsation | Tiny FX |
| Airstream anemomener | Messsonde xx43 Testoterm KG |
| Stroposkop | Digita 1-20000 Hz Mawomatic Mayer Wonisch Mietzel GmbH SLV1000-Studio (Leuchte) |

FIG. 11 shows the results of the determination of the $c_w$ value. The $C_w$ value of the truck with upstream wind turbine (COE-TuWing) can be adjusted even with the unoptimized model wind turbine so that it corresponds to the $C_w$ value of a standard LkW. In addition, additional energy can be generated in the case of the truck with attached wind turbine.

FIG. 12 shows the experimental results for the determination of the normalized wind turbine power as a function of the distance of the wind turbine from the vehicle front. To prevent interference effects between the wind turbine and the truck, a distance of the rotor plane (wind turbine) to the front of the truck of 0.3-0.4 wind turbine diameter is optimal. At this distance, there is no or only a particularly low power loss of the wind turbine.

FIG. 13 shows the experimental normalized resistance force versus normalized wind speed. From the experimental data of FIG. 13, the influence of the wind turbine slipstream on the truck can be read very well by varying the distance between wind turbine and truck. The experimentally determined resistance forces in the measurement configuration Konfig. 1 shows a significant decrease in the presence of the wind turbine rotating by the airstream. The values shown in FIG. 13 are normalized to $c_{norm}=12$ m/s, or are normalized to the unaffected resistance force at 12 m/s. The significant reduction of truck drag (aerodynamic resistance force) within the wind turbine slipstream is sufficient to compensate completely the significant aerodynamic and dissipative forces of the model wind turbine.

FIG. 15 shows a schematic illustration of the airflow guidance through the windshield and wind turbine for a preferred embodiment of the turbine system at the example of a CBE truck. FIG. 15A shows a side view of the turbine system mounted on a truck. FIG. 15B shows the side view with focus on the turbine system and FIG. 15C shows a front view with focus on the turbine system. As it can be seen in FIG. 15, the two components, windshields and wind turbine, cover almost the entire frontal projection area of the truck. By the windshield, a portion of the high-energy airstream is directed past the vehicle (energy airflow), while the other high-energy component flows through the wind turbine and fills the volume on the leeward (back) of the windshield (slipstream airflow). Energy airflow and slipstream airflow have a significant speed difference immediately downstream of the windshield. The speed of the airflow is represented by vector arrows. The speed reduction is achieved on the one hand by the conversion of kinetic into usable energy, in that the airflow drives the wind turbine. On the other hand, the widening of the slipstream airflow on the rear of the windshield results in a significant reduction in the speed which acts on the vehicle front, and thus in lower airstream resistance.

In the preferred embodiment shown, the windshield is an annular housing whose distance increases between the outer contour edge and the wind turbine axis to the vehicle-facing side. As it can be seen, the inner diameter of the windshield at the axial position of the rotor blade leading edge is greater than the outer diameter of the wind turbine, so that the windshield surrounds the wind turbine. In the side views of FIG. 15A, B, the radial increase of the outer contour is shown by the minimum distance between the outer contour at the front and the wind turbine axis and by the maximum distance between the outer contour at the rear and the wind turbine axis. The preferred increase is not uniform, but is flatter in the front section and steeper in the rear section and also depends on the circumferential position. The resulting pitch angle at the most downstream axial position of the windshield outer contour (and in this case also the largest distance between windshield outer contour and wind turbine axis) is about 20°. The resulting pitch angle at the furthest downstream position of the windshield outer contour at 6 o'clock circumferential position and thus the smallest distance between windshield outer contour and roadway floor is about 8°. Upstream of the wind turbine, the resulting pitch angle in the front portion of the windshield is nearly 0°. To avoid flow separation on the inner contour side of the windshield at greater pitch angles than 8°, it may be preferred to use louvers, for example, through which high-energy air from the outer contour (energy airflow) can be injected into the risk of separation zones or low-energy air (slipstream airflow) of the inner contour are sucked at the risk of separation zones by means of venturi effect, for example. As a result, both the energy airflow is deflected particularly lossless, and the slipstream airflow expanded particularly lossless. The introduction of the windshield forces in the wind turbine mount should preferably be done with aerodynamic profile struts, which can be used simultaneously for vortex reduction, to ensure a low-vortex guidance of the airflows along the vehicle. In particular, it can also be ensured that, when merging both air streams, no loss-making vortexes occur at the shear layer of the slipstream airstream and of the energy airstream.

At the frontal view of FIG. 15C, it can be seen that the frontal projection of the outer contour of the windshield in the preferred embodiment forms a rounded rectangle adapted to the shape of the vehicle front. This makes it possible to implement a particularly high coverage of the vehicle front of more than 90% so that an energetically favorable airstream shielding can be achieved.

Analogously to FIG. 15, FIG. 16 shows a schematic illustration of the airflow guidance through the windshield and through a turbine for a preferred embodiment of the turbine system attached to a train. In the illustrated embodiment, the turbine is a gas turbine (aero derivative), which is located in front of the vehicle front of a train. In this case as well, the windshield and the gas turbine (aerodervative) almost completely cover the frontal projection area of the train. By the windshield, a part of the high-energy airstream is directed past the train (energy airflow), while another high-energy component flows through the gas turbine (aero derivative) (slipstream airflow). By widening the slipstream airflow in combination with a reduction in the speed of the airflow through the passage of the gas turbine (aero derivative), there is a significant reduction in the airstream resistance. The resulting pitch angle at the most downstream axial position of the windshield outer contour (and in this case also the largest distance between windshield outer contour and wind turbine axis) is about 15°.

In addition, a direct feed of the electricity generated by the gas turbine (aero derivative) in a power grid is possible (not shown).

The results for the composition of the aerodynamic motion resistance of a truck with and without wind turbine (without windshield) shown in FIG. 17 have been determined analytically on the basis of wind tunnel tests with a truck model equipped with a wind turbine (without windshield, see FIG. 9). If a windshield is added that can cover the entire rectangular front of the truck, than the truck can be wrapped in a low-speed area as a whole. Initial analyzes have shown that the aerodynamic motion resistance components (of the truck) shown in FIG. 17 will be substantially smaller at a truck equipped with the turbine system and with a windshield according to the invention. The additional axial force due to the windshield can be more than compensated, so that the aerodynamic motion resistance of the vehicle is smaller than in a vehicle with a powered wind turbine without windshield.

LIST OF REFERENCE NUMBERS 1 vehicle with turbine system
2 vehicle without turbine system
3 model truck
10 turbine
11 wind turbine
12 turbine mount
14 engine of the vehicle
16 windshield (also referred to as gondola or ring housing)
18 cow catcher
20 mechanical coupling between wind turbine and engine
22 dynamic pressure 24 boundary layer
26 driving direction
28 air resistance due to wind turbine
30 movement resistance of the vehicle (rolling and aerodynamic resistance)
32 engine power
34 rotor blade
36 linkage of wind turbine mount
38 roll bar of the wind turbine mount
40 father piece of the centrifugal clutch
42 struts
44 metal frame
46 carrier plate
48 chassis of the vehicle
50 protection and mounting aid
52 gear 1
54 shaft
56 centrifugal clutch 2
58 nut piece of the centrifugal clutch
60 chain 1
62 gear 2
64 wind tunnel
66 measuring section MB1
68 model wind turbine mounted on the wind tunnel floor
70 model wind turbine mounted on the truck model
72 gear 3
74 gear 4
76 bearings 1
78 bearings 2
80 chain 2
82 generator
84 power electronics (belonging to the generator)
86 slipstream airflow
88 energy airflow
90 gas turbine (aeroderivative)

TABLE 1

Boundary conditions for the Fuel saving potential[3,4]

| Boundary conditions | | |
|---|---|---|
| Air density | 1.20 | kg/m³ |
| Radius wind turbine | 1.50 | m |
| Front area truck | 11.25 | m² |

| | Flow speed in front of wind turbine | | |
|---|---|---|---|
| Reference Force $F_{St}$ | 25 m/s | 30 m/s | 45 m/s |
| $F_{St}$ [N] | 2650 | 3817 | 8588 |

| Schnelllaufzahl $\lambda_A$ [—] | $c_1/c_0$ | $c_p$ | $c_s$ | $c_M$ [—] |
|---|---|---|---|---|
| 7 | 0.35 | 0.52 | 0.90 | 0.075 |
| 4 | 0.72 | 0.39 | 0.50 | 0.095 |

| Truck $F_w$ [N] + $F_s$ [N] @ | | with TUNING | |
|---|---|---|---|
| $c_0$ = 25 m/s ($c_0$ = 30 m/s) | without TUNING | $c_p$ = 0.52 | $c_p$ = 0.39 |
| $c_w$ = 1.1 (worse aerodynamic shape) | 4640N (6682N) | 2953N (4253N) | 3730N (5372N) |
| $c_w$ = 0.7 (standard aerodynamic shape) | 2952N (4252N) | 2746N (3955N) | 2856N (4112N) |
| $c_w$ = 0.5 (good aerodynamic shape) | 2109N (3037N) | 2646N (3827N) | 2418N (3482N) |
| Truck engine unload capacity | | 34 kW (59 kW) | 26 kW (44 kW) |

[3]Gasch, Robert; Windkraftanlagen; 2nd edition, B. G. Teubner Stuttgart, p.157
[4]Bohl/Elmendorf, Strömungsmaschinen 1 (Fluidmachine 1), Kamprath-Reihe, 11th edition, p. 221

TABLE 2

Saving potential of fuel and costs for different trucks equipped with TUNING technologie[5]

| | | Fuel saving capability | | | | | |
|---|---|---|---|---|---|---|---|
| | | | | min. saving with TUNING | | max. saving with TUNING | |
| Truck unloaded (0 t load), horizontally, | minimum power [kW] to overcome drag and | fuel consumption in [l] | | [l] per 100 km | | [l] per 100 km | |
| $c_w$ = 0.7 | roll resistance | min | max | [kW] | diesel | [kW] | diesel |
| 42 t Truck @ 57 mph | 90 | 20 | 24 | 34 | 7.6 | 34 | 9.1 |
| 60 t truck @ 57 mph | 110 | 30 | 33 | 34 | 9.3 | 34 | 10.2 |
| 42 t Truck @ 68 mph (*) | 125 | 27 | 32 | 59 | 12.7 | 59 | 15.1 |
| 60 t truck @ 68 mph (*) | 150 | 38 | 43 | 59 | 14.9 | 59 | 16.9 |

| | | cost saving capability | | | | | |
|---|---|---|---|---|---|---|---|
| | diesel prize per L | 1 | € | Mileage | 105000 | km per year | |
| Truck unloaded (0 t load), horizontally, | minimum power [kW] to overcome drag and | fuel consumption in [l] | | min. saving with TUNING | | max. saving with TUNING | |
| $c_w$ = 0.7 | roll resistance | min | max | [kW] | [€] | [kW] | [€] |
| 42 t Truck @ 57 mph | 90 | 20 | 24 | 34 | 7933.3 | 34 | 9520.0 |
| 60 t truck @ 57 mph | 110 | 30 | 33 | 34 | 9736.4 | 34 | 10710.0 |
| 42 t Truck @ 68 mph (*) | 125 | 27 | 32 | 59 | 13381.2 | 59 | 15859.2 |
| 60 t truck @ 68 mph (*) | 150 | 38 | 43 | 59 | 15694.0 | 59 | 17759.0 |

(*) values estimated

[5]Nylund, Nils-Olof; Heavy-duty truck emissions and fuel consumption simulating real-world driving in laboratory conditions; VTT technical research centre of Finnland; DEER conference, August 21-25, Chicago, Illonois, USA

TABLE 3

Test configuration and boundary conditions
for the measurement in the wind tunnel

| Test configurations | |
|---|---|
| Konfig 1 | Truck model and measurement scale connected. Wind turbine mounted on the measurement section floor (forces are not measured by the measurement scale) |
| Konfig 2 | Wind turbine and truck model connected via a rod (Resistance force of truck and wind turbine are detected by the measurement scale) |
| Boundary conditions | |
| $T_{Air}$ | 11° C. |
| $\rho_{Air}$ | 1.25 kg/m³ (@11° C.) |
| $A_{LKW\_Front}$ | 0.1334 m² |
| $C_w$ | 0.79 (COE-LKW) |
| $\lambda_{Tip}$ | ≈2.4 (Tip speed ratio @ rotor blade pitch 6°) Truck model aligned in the wind tunnel so that wind tunnel flow generates no lateral forces on the truck |

The invention claimed is:

1. A combination of a vehicle (2) and a turbine system for fuel saving in the vehicle, the turbine system comprising a turbine (10) and a turbine mount (12) with a windshield (16), the windshield (16) and the turbine (10) having a cross-sectional area which is at least 60% of the frontal projection area of the vehicle and the turbine (10) is attachable by means of a turbine mount (12) on at least one of the vehicle front or on a chassis in front of the vehicle front, the windshield (16) being an annular housing which surrounds the turbine (10) and has an outer contour whose distance from the axis of rotation of the turbine increases towards the side of the windshield facing the vehicle (2), the increase in the distance between the outer contour of the windshield (16) and the axis of the turbine is characterized by a pitch angle of 5° to 35°, the outer contour of the windshield (16) in the frontal projection is not circular, but is adapted to the shape of the frontal projection area of the vehicle front and forms a rounded rectangle.

2. The combination of a vehicle and a turbine system of claim 1 characterized in that the distance between the turbine (10) and the front of the vehicle is between 10% and 200% of the diameter of the turbine (10).

3. The combination of a vehicle and a turbine system of claim 1 characterized in that the turbine is a wind turbine (11).

4. The combination of a vehicle and a turbine system of claim 3 characterized in that the wind turbine (11) has 1 to 7 rotor blades (34).

5. The combination of a vehicle and a turbine system of claim 3 characterized in that the turbine system comprises a torque transmission unit which transmits mechanically the torque of the wind turbine (11) to the rotary shaft of the engine of the vehicle (2).

6. The combination of a vehicle and a turbine system of claim 5 characterized in that the torque transmission unit comprises a centrifugal clutch with integrated freewheel.

7. The combination of a vehicle and a turbine system of claim 1 characterized in that the turbine system comprises a generator (82) and the turbine (10) drives the generator (82) to generate electrical power.

8. The combination of a vehicle and a turbine system of claim 1 characterized in that the vehicle (2) comprises at least one of an electric motor or a hybrid motor and wherein electrical current for driving the at least one of the electric motor or the hybrid motor is provided by the generator.

9. The combination of a vehicle and a turbine system of claim 7 characterized in that the vehicle (2) comprises one or more electrical devices, the one or more electrical devices comprising at least one of: air conditioning, music system, refrigeration unit, lighting means, onboard computer, navigation device, TV set, or driver assistance system.

10. The combination of a vehicle and a turbine system of claim 1 characterized in that the vehicle (2) is at least one of a truck, a passenger car, a flying object or a train.

11. The combination of a vehicle and a turbine system of claim 1 characterized in that the windshield (16) is fixed at the upper end by means of a linkage (36) attached to a roll bar (38) mounted on the vehicle housing and the windshield (16) is attached at the lower end by means of a support plate on the chassis of the vehicle (2).

12. The combination of a vehicle and a turbine system of claim 1 characterized in that the turbine (10) is mounted by means of the turbine mount (12) on at least one of the vehicle front or on the chassis in front of the vehicle front.

* * * * *